(12) United States Patent
Saito et al.

(10) Patent No.: US 7,995,439 B2
(45) Date of Patent: Aug. 9, 2011

(54) OPTICAL DISC APPARATUS AND OPTICAL DISC REPLAY METHOD

(75) Inventors: Kimihiro Saito, Saitama (JP); Kunihiko Hayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 268 days.

(21) Appl. No.: 12/423,357

(22) Filed: Apr. 14, 2009

(65) Prior Publication Data
US 2009/0262633 A1 Oct. 22, 2009

(30) Foreign Application Priority Data
Apr. 17, 2008 (JP) ................................. 2008-108228

(51) Int. Cl.
*G11B 7/00* (2006.01)
(52) U.S. Cl. ................................. 369/53.28; 369/112.23
(58) Field of Classification Search ............. 369/112.23, 369/44.14, 44.26, 53.28
See application file for complete search history.

(56) References Cited

U.S. PATENT DOCUMENTS

| | | | |
|---|---|---|---|
| 4,748,610 A | 5/1988 | Nakata et al. | |
| 6,101,157 A | 8/2000 | Bradshaw et al. | |
| 6,574,174 B1 * | 6/2003 | Amble et al. | 369/44.26 |
| 6,963,520 B1 | 11/2005 | Park et al. | |
| 2005/0195707 A1 | 9/2005 | Park et al. | |
| 2006/0114794 A1 | 6/2006 | Suzuki et al. | |
| 2008/0049585 A1 * | 2/2008 | Shindo | 369/112.23 |
| 2008/0130458 A1 * | 6/2008 | Shiono et al. | 369/94 |
| 2008/0170486 A1 * | 7/2008 | Sato et al. | 369/112.05 |
| 2009/0296542 A1 | 12/2009 | Miyamoto et al. | |

FOREIGN PATENT DOCUMENTS

| | | |
|---|---|---|
| JP | 58-041447 A | 3/1983 |
| JP | 60-170035 A | 9/1985 |
| JP | 60-258739 A | 12/1985 |
| JP | 62-167628 A | 7/1987 |
| JP | 07-021565 A | 1/1995 |
| JP | 2001-067714 A | 3/2001 |
| JP | 2003-315988 A | 11/2003 |
| JP | 2005-235282 A | 9/2005 |
| JP | 2006-114168 A | 4/2006 |
| JP | 2008-071433 A | 3/2008 |

* cited by examiner

*Primary Examiner* — Adam R Giesy
(74) *Attorney, Agent, or Firm* — Wolf, Greenfield & Sacks, P.C.

(57) ABSTRACT

When an optical disc apparatus reproduces information from an optical disc, it converges a reading light beam emitted from an LED to substantially collimated light and projects it to the optical disc to cause it to be reflected by reflection surface thereof so as to make it become a reading reflected light beam. Then, the apparatus converges the reading reflected light beam by a mark layer selection lens, detects the reading reflected light beam passing through the target position by a detection region located at the confocal point of the target position and generates a detection signal. Subsequently, the apparatus recognizes the presence or absence of a recording mark based on the detection signal to reproduce the information. Thus, the apparatus can detect the state of the reading reflected light beam observed when it passes the target position and can recognize the presence or absence of a recording mark.

11 Claims, 10 Drawing Sheets

OPTICAL DISC APPARATUS AND OPTICAL DISC REPLAY METHOD

CROSS REFERENCE TO RELATED APPLICATIONS

The present invention contains subject matter related to Japanese Patent Application JP 2008-108228 filed in the Japanese Patent Office on Apr. 17, 2008, the entire contents of which being incorporated herein by reference.

BACKGROUND OF THE INVENTION

1. Field of the Invention

The present invention relates to an optical disc apparatus and an optical disc replay method that can suitably be used, for instance, for an optical disc apparatus for reproducing information from an optical disc where information is recorded.

2. Description of the Related Art

Optical disc apparatus for emitting a light beam onto an optical disc such as a compact disc (CD), a digital versatile disc (DVD) or a Blu-ray disc (registered trademark: to be referred to as BD hereinafter) and reproducing information from the disc by reading reflected light have become very popular.

With regard to optical discs, it is known that the size of the light spot formed on the optical disc is defined to be about $\lambda$/NA ($\lambda$: light beam wavelength, NA: numerical aperture) and the resolution is proportional to this value. With the BD system, for example, about 25 GB of data can be recorded on an optical disc with a diameter of 120 mm.

Optical discs are being used to record various pieces of information such as audio contents, video contents and a variety of computer data. The quantity of information to be recorded on an optical disc has increased because of the availability of high definition images and high quality sounds, so that there is a demand for large capacity optical discs that can record a large number of contents.

Optical disc apparatus designed to form a plurality of layers of recording marks in the uniform recording layer of an optical disc in a recording operation have been proposed in order to realize large capacity optical discs (refer to, e.g., Jpn. Pat. Appln. Laid-Open Publication No. 2007-220206 [FIGS. 1, 4 and 5]).

Such an optical disc apparatus converges a light beam so as to focus the light beam onto a recording mark that may be formed on an optical disc and receives reflected light that is produced as the light beam is reflected by the recording mark that may be there. Then, the optical disc apparatus recognizes the presence or absence of a recording mark there from received light and executes a predetermined demodulation process and a predetermined decoding process in order to ultimately reproduce information.

SUMMARY OF THE INVENTION

When, for instance, such an optical disc apparatus reproduces information from an optical disc, it needs to highly accurately focus the light beam onto the recording mark.

Particularly, when a plurality of recording mark layers are formed in the optical disc, the focus position of the light beam needs to be adjusted two-dimensionally.

More specifically, the optical disc apparatus needs to control the position of the objective lens and so on highly accurately by means of a servo mechanism or the like. Thus, there arises a problem that it inevitably needs a complex objective lens control mechanism to consequently make itself sophisticated and large.

The present invention has been made in view of the above-identified problem and proposes an optical pickup and an optical disc apparatus that can accurately reproduce information from an optical disc with a simple arrangement.

In order to solve the problem, the present invention provides an arrangement for an emission step of: emitting a reproducing light beam not to be converged to a single spot at the time of convergence from a predetermined reproducing light source onto an optical disc having a recording layer including one or more mark layers bearing a plurality of recording marks representing respective pieces of information arranged on a virtual plane and a reflection surface for reflecting the light beam to be used for reproducing the information; changing the angle of divergence of the reproducing light beam into substantially collimated light from the irradiation surface side opposite to the reflection surface with the recording layer interposed between them in the optical disc by a predetermined objective lens and irradiating with collimated light so as to include the target position in the target mark layer; having a detection region being provided at the confocal point with the target position of the reproducing light beam passed through the recording layer, reflected by the reflection layer and passed through the recording layer and the objective lens once again to detect the quantity of light in the detection region; and recognizing the presence or absence of the recording mark at the target position on the basis of the outcome of detection in the detection region in order to reproduce the information.

Thus, according to an aspect of the present invention, when a reproducing light beam of substantially collimated light is emitted so as to include a target position, it is possible to detect that the reproducing light beam is blocked by a recording mark on the basis of the outcome of detection in a detection region at the confocal point of the target position and recognize the presence or absence of the recording mark at the target position.

According to the present invention, when a reproducing light beam of substantially collimated light is emitted so as to include a target position, it is possible to detect that the reproducing light beam is blocked by a recording mark according to the outcome of detection in a detection region at the confocal point of the target position and recognize the presence or absence of a recording mark at the target position so that it is now possible to realize an optical pickup and an optical disc apparatus having a simple configuration that can accurately reproduce information from an optical disc.

The nature, principle and utility of the invention will become more apparent from the following detailed description when read in conjunction with the accompanying drawings in which like parts are designated by like reference numerals or characters.

DETAILED DESCRIPTION OF THE PREFERRED EMBODIMENTS

Now, preferred embodiments of the present invention will be described in greater detail by referring to the accompanying drawings.

(1) First Embodiment

(1-1) Configuration of Optical Disc

Figure 1:
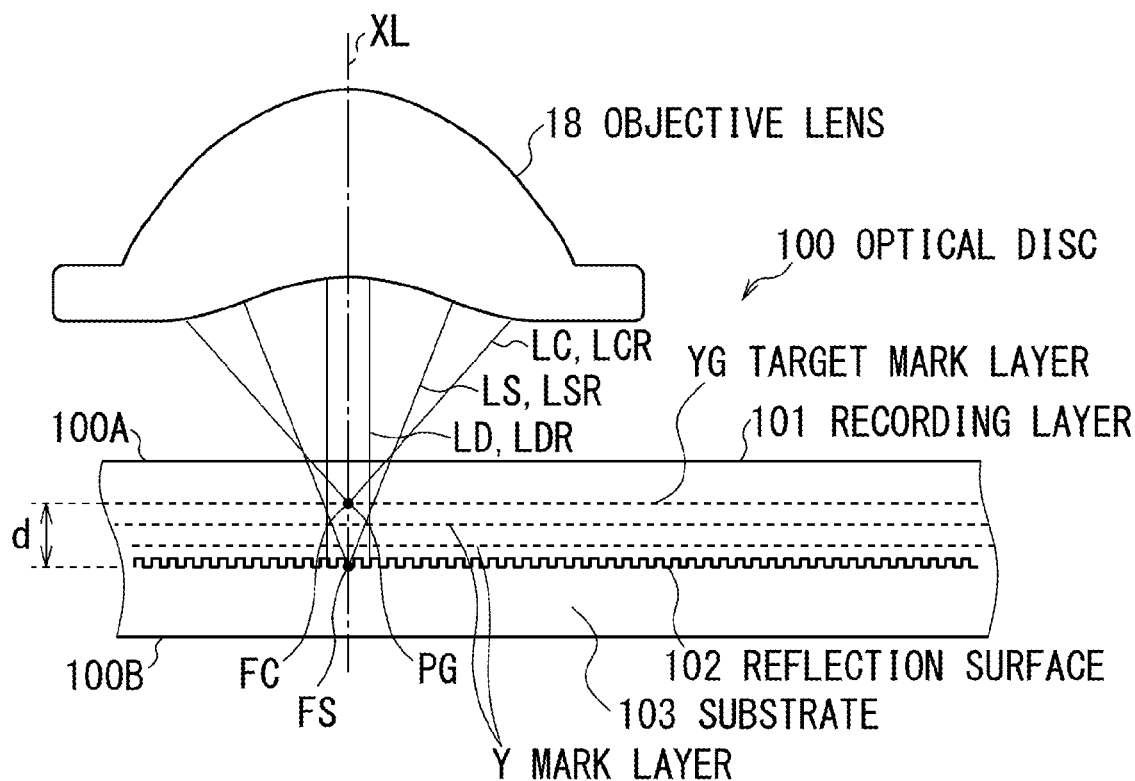
FIG. 1 is a schematic diagram illustrating irradiation of a light beam onto an optical disc.

FIG. 1 schematically shows a cross section of an optical disc. Referring to FIG. 1, the optical disc 100 is adapted to record information as a recording mark RM that represents a piece of information is formed in a recording layer 101. The optical disc is also adapted to reproduce information according to the presence or absence of a recording mark RM.

The recording layer 101 is typically formed by mixing a resin material with a predetermined photo-polymerization initiator and hardened. As a recording light beam LC is converged to the recording layer 101, the temperature of the recording layer rises violently at and around the focus FC to gasify the photo-polarization initiator and form a bubble at and around the focus.

The produced cavity operates as a recording mark RM. The recording mark RM shows a refractive index that remarkably changes at the boundary surface of the resin material relative to the cavity so that the irradiated light beam is not transmitted but reflected or absorbed there.

For instance, no recording mark RM is formed when the code value of a piece of information that is binarized and encoded is equal to "0", whereas a recording mark RM is formed when the code value is equal to "1". The piece of information is recorded there in this way.

The optical disc 100 is formed by bonding a substrate 103 for providing a certain degree of strength and a recording layer 101 and a reflection surface 102 is formed along the boundary surface of the recording layer 101 and the substrate 103.

The reflection surface 102 reflects light with a high reflectance and is provided with guide grooves for servo. It has spiral tracks T formed by lands and grooves as in the case of an ordinary BD-R (recordable).

The recording position of each recording mark RM can be identified by a land and groove of a track T and a series of addresses are assigned to predetermined respective recording units so that the position where a piece of information is to be recorded or reproduced can be identified by the address assigned there.

In operation, a plurality of recording marks RM are arranged spirally on a plane running in parallel with the reflection surface 102 so as to correspond to the tracks T of the reflection surface 102 relative to the direction of the thickness of the optical disc 100. Thus, tracks of recording marks RM (to be referred to as mark tracks MT hereinafter) are formed in the recording layer 101 and a layer of recording marks RM (to be referred to as mark layer Y hereinafter) is also formed in the optical disc 100.

A plurality of mark layers Y are formed in the recording layer 101 to show different distances relative to the reflection surface 102.

When information is to be reproduced from an optical disc 100, on the other hand, a reading light beam LD is emitted from the side of the irradiation surface 100A of the optical disc 100 and reflected by the reflection surface 102 to become a reading reflected light beam LDR.

The reading light beam LD and the reading reflected light beam LDR are not converged to a single focus but show a certain degree of spread unlike a recording light beam LC.

The reading reflected light beam LDR proceeds through the recording layer 101 from the side of the reflection surface 102 to the side of the irradiation surface 100A and, if there is a recording mark RM on the way, it is partly blocked by the recording mark RM.

Figure 2:
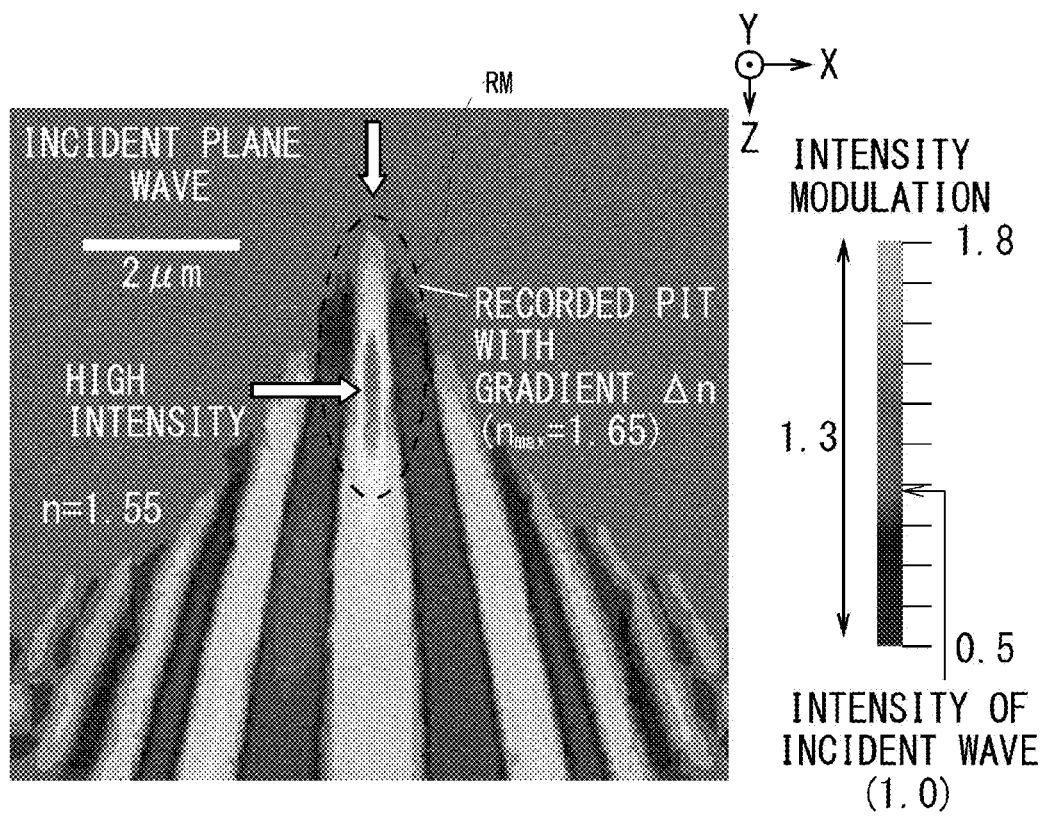
FIG. 2 is a schematic illustration of the electric field around a recording mark.

Then, the electric field at and near the recording mark RM in the optical disc 100 is computationally determined to obtain an outcome of computations as shown in FIG. 2. From the outcome of computations, it will be seen that the reading reflected light beam LDR shows a change in the electric field as it passes at or near the recording mark RM.

The change in the electric field due to the presence of a recording mark RM can be detected by detecting the quantity of light of the reading reflected light beam LDR by means of a photodetector or the like. Additionally, it is possible to recognize the presence or absence of a recording mark RM according to the outcome of detection.

In this way, recording marks RM are formed over a plurality of mark layers Y of the optical disc 100 as so many pieces of information. Then, the presence or absence of each recording mark RM can be recognized by using a reading reflected light beam LDR produced as a reading light beam LD is reflected by the reflection surface 102 of the optical disc 100.

(1-2) Configuration of Optical Disc Apparatus

Figure 3:
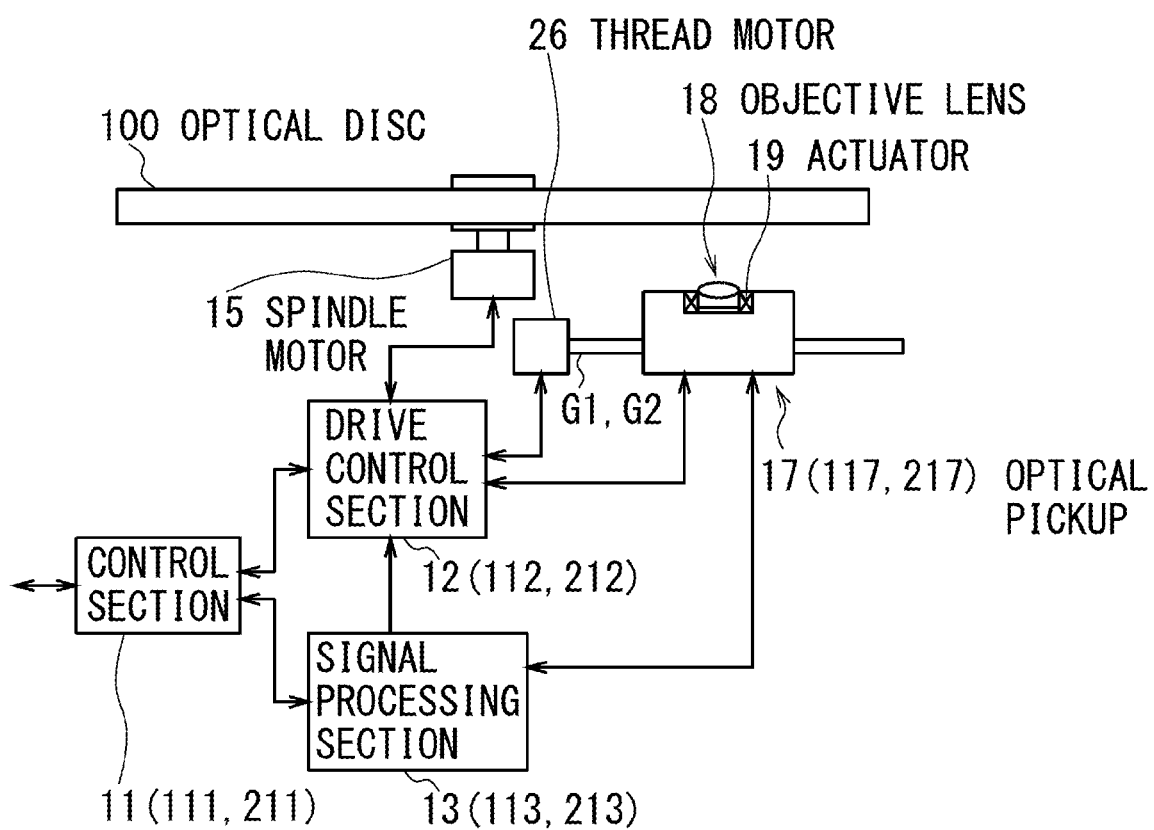
FIG. 3 is a schematic block diagram of an optical disc apparatus.

The optical disc apparatus 10 shown in FIG. 3 is adapted to record information by irradiating an optical disc 100 with a light beam and reproduce information by receiving part of the light beam emitted onto the optical disc 100 that is reflected to come back from the optical disc 100.

The optical disc apparatus 10 is formed with a control section 11 that is the center of the apparatus. The control section 11 is formed by using a central processing unit (CPU), a read only memory (ROM) storing various programs and a random access memory (RAM) to be used as work memory by the CPU.

When recording information on the optical disc 100, the control section 11 drives a spindle motor 15 to rotate by way of a drive control section 12 so as to rotate the optical disc 100 mounted on a turn table (not shown) at a desired rate.

Additionally, the control section 11 drives a thread motor 16 to rotate by way of the drive control section 12 so as to move the optical pickup 17 to a large extent in the tracking direction along the axes G1 and G2 for moving the optical pickup 17, or toward the inner peripheral side or the outer peripheral side of the optical disc 100.

A plurality of optical parts such as an objective lens 18 are fitted to the optical pickup 17 and the optical pickup 17 irradiates a light beam toward the optical disc 100 under the control of the control section 11. Additionally, the optical pickup 17 receives the light beam reflected by and coming back from the optical disc 100 and generates a detection signal according to the outcome of the reception of the light beam, which is then supplied to signal processing section 13.

The signal processing section 13 executes a predetermined arithmetic process, using the detection signal supplied to it, to generate a focus error signal SFE and a tracking error signal STE, which are then supplied to the drive control section 12.

The drive control circuit 12 generates a drive signal for driving the objective lens 18 on the basis of the focus error signal and the tracking error signal supplied to it and they supplies them to the biaxial actuator 19 of the optical pickup 17.

The biaxial actuator 19 operates for focus control and tracking control according to the drive signal so as to make the focus of the light beam converged by the objective lens 18 agree with a desired position.

As a result, the optical disc apparatus 10 forms a recording mark RM at the desired position in the optical disc 100 or detects the presence or absence of a recording mark RM at the desired position (as will be described in greater detail hereinafter).

In this way, the optical disc apparatus 10 irradiates a light beam onto the optical disc 100 by means of the optical pickup 17 and detects the light beam coming back from the optical disc 100 by means of the optical pickup 17.

(1-3) Configuration of Optical Pickup

Figure 4:
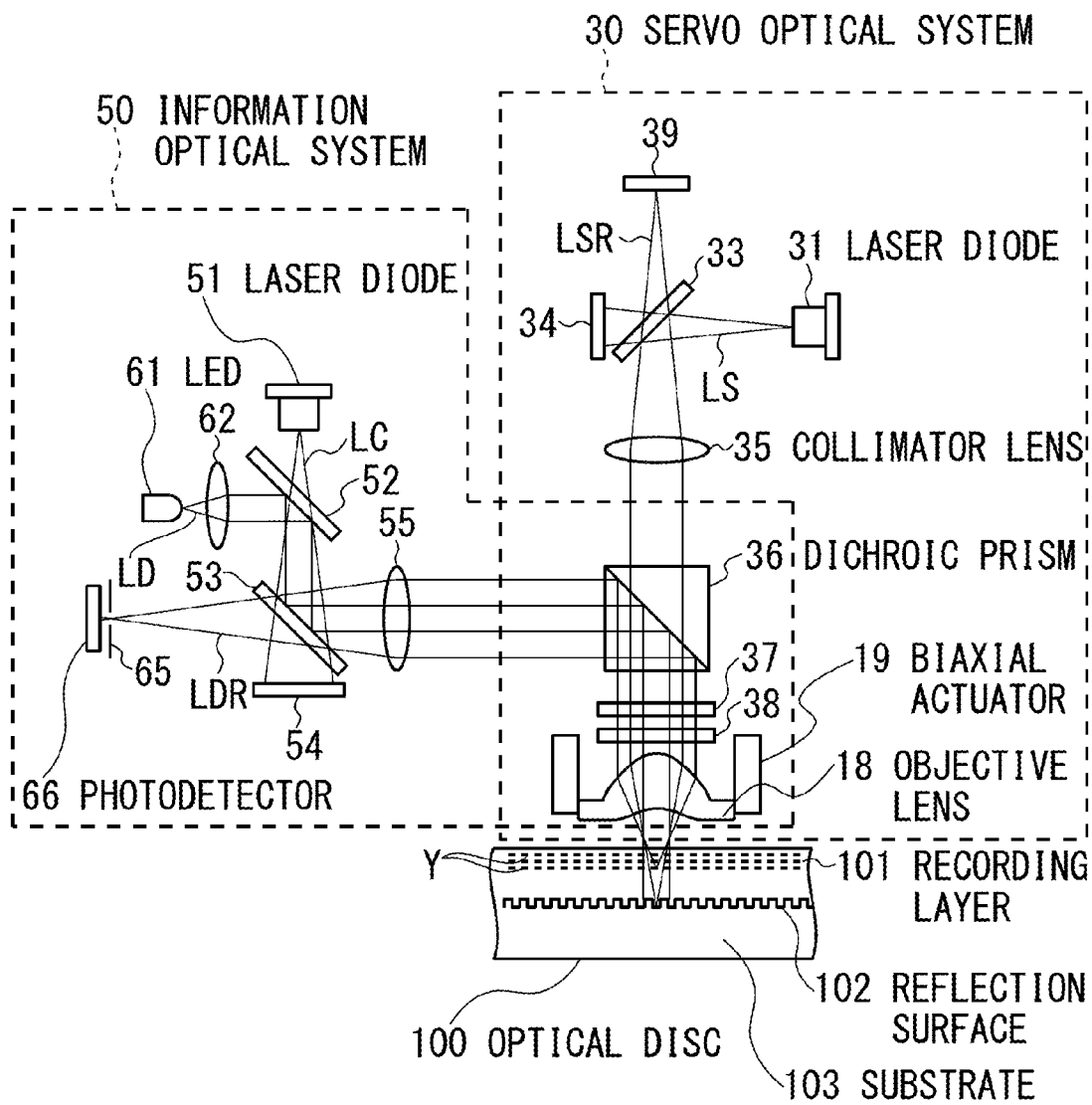
FIG. 4 is a schematic block diagram of optical pickup according to a first embodiment of the present invention.

Now, the configuration of the optical pickup 17 will be described below. The optical pickup 17 is formed by combining a large number of optical parts and includes a servo optical system 30 that operates mainly for position control of the objective lens 18 and an information optical system 50 that operates mainly for recording and reproducing information as shown in FIG. 4.

(1-3-1) Configuration of Servo Optical System

The servo optical system 30 irradiates a servo light beam LS onto the irradiation surface 100A of the optical disc 100 and receives the servo reflected light beam LSR that is produced as the servo light beam LS is reflected by the optical disc 100.

The laser diode 31 of the servo optical system 30 is adapted to emit a red laser beam with a wavelength of about 660 nm. In operation, the laser diode 31 emits a servo light beam LS that is linearly polarized light (e.g., S-polarized light) and also divergent light and makes it enter a polarization beam splitter 33.

The polarization beam splitter 33 has a characteristic property of showing a reflectance and a transmittance that vary as a function of the direction of polarization of the light beam striking it. For instance, it may transmit a P-polarized light beam by about 100% but reflect an S-polarized light beam by about 90% and transmit the remain of about 10%.

In operation, the polarization beam splitter 33 reflects the servo light beam LS that is an S-polarized light beam by about 90% so as to make it enter a collimator lens 35 and transmits the servo light beam LS by about 10% so as to make it strike a photodetector 34. The servo light beam LS that is made to strike the photodetector 34 will be referred to as monitoring servo light beam LSM herein after.

The photodetector 34 receives the monitoring servo light beam LSM and generates a detection signal SSM that corresponds to the quantity of light thereof, which the detection signal SSM is then supplied to the drive control section 12. The drive control section 12 maintains the quantity of light of the servo light beam LS to a desired level by feedback-controlling the quantity of light of the servo light beam LS emitted from the laser diode 31 according to the detection signal SSM.

On the other hand, the collimator lens converts the servo light beam LS from divergent light into collimated light and makes it enter a dichroic prism 36.

The dichroic prism 36 has a reflection/transmission surface 36S that shows a wavelength selectivity of showing a variable transmittance and a variable reflectance that vary as a function of the wavelength of the incident light beam. It is adapted to transmit a light beam of a wavelength of about 660 nm by about 100% and reflect a light beam of wavelength of about 405 nm by about 100%.

Thus, the dichroic prism 36 transmits the servo light beam LS having a wavelength of about 660 nm at the reflection/transmission surface 36S thereof and allows it to enter an aberration correcting section 37. The aberration correcting section 37 corrects the aberration of the servo light beam LS and makes it strike a ¼ wave plate 38.

The ¼ wave plate 38 converts a light beam from linearly polarized light to circularly polarized light or vice versa. For instance, it may convert the servo light beam LS that is S-polarized light into left circularly polarized light and makes it enter the objective lens 18.

The objective lens 18 converges the servo light beam LS and irradiates it to the irradiation surface 100A of the optical disc 100.

The servo light beam LS is transmitted through the recording layer 101 (FIG. 1) and reflected by the reflection surface 102 to become a servo reflected light beam LSR directed in the direction opposite to the servo light beam LS (in other words, in the direction toward the objective lens 18).

When the servo reflected light beam LSR is reflected by the reflection surface 102 of the optical disc 100, its direction of circular polarization is inverted to become right circularly polarized light.

Subsequently, the servo reflected light beam LSR is converted into collimated light by the objective lens 18 and further from right circularly polarized light into P-polarized light (or linearly polarized light) by the ¼ wave plate 38 before it is made to enter the dichroic prism 36 by way of the aberration correcting section 37.

The dichroic prism 36 transmits the servo reflected light beam LSR at the reflection/transmission surface 36S thereof and makes it enter the collimator lens 35. The collimator lens 35 converges the servo reflected light beam LSR and makes it strike the polarization beam splitter 33.

The polarization beam splitter 33 transmits the servo reflected light beam LSR that is P-polarized light by about 100% so as to make the servo reflected light beam LSR irradiate a photodetector 39.

Note that, the optical positions of various optical parts of the servo optical system 30 are adjusted so as to make the focused state of the servo light beam LS when it is converged by the objective lens 18 and irradiated onto the reflection surface 102 of the optical disc 100 to be reflected to the focused sate of the servo reflected light beam LSR when it is converged by the collimator lens 35 and projected onto the photodetector 39.

Figure 5A:
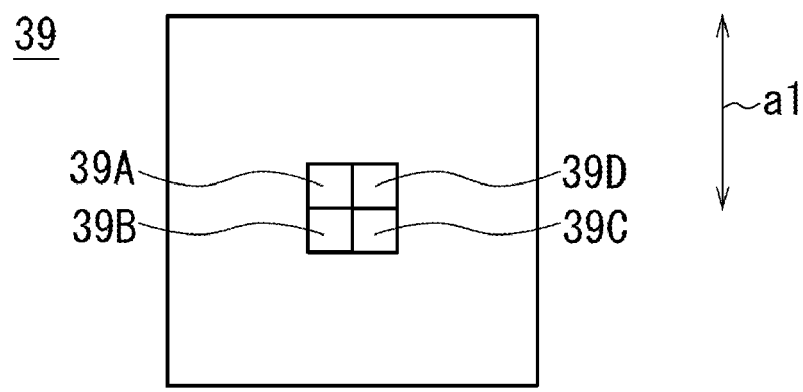
FIGS. 5A and 5B are schematic illustrations of the photodetector of the first embodiment.

The photodetector 39 has a surface area to be irradiated with the servo reflected light beam LSR that is divided into four detection regions 39A, 39B, 39C and 39D so as to appear like a lattice as shown in FIG. 5A. Note that the direction indicated by a double arrow a1 in FIG. 5A corresponds to the running direction of the track T when the servo light beam LS is irradiated onto the reflection surface 102 (FIG. 1).

The photodetector 39 detects part of the servo reflected light beam LSR by each of the detection regions 39A, 39B, 39C and 39D and generates detection signals U1A, U1B, U1C and U1D that represents the detected quantities of light (to be also collectively referred to as a servo detection signal U1 hereinafter), which detection signals U1A, U1B, U1C and U1D are then sent out to the signal processing section 13 (FIG. 3).

The optical disc apparatus 10 is designed to operate for focus control of the objective lens 18 by means of a so-called astigmatism method.

The signal processing section 13 computationally determines a focus error signal SFE1 by means of formula (1) shown below, using the servo detection signal U1 (or the detection signals U1A through U1D).

$$SFE1 = (U1A + U1C) - (U1B + U1D) \quad (1)$$

The focus error signal SFE1 represents the quantity of relative displacement of the focus FS of the servo light beam LS (FIG. 1) and the reflection surface 102 of the optical disc 100 in the focusing direction.

The drive control section 12 generates a focus drive signal SFD according to the focus error signal SFE1 and supplies it to the biaxial actuator 19. The biaxial actuator 19 drives the objective lens 18 in the focusing direction according to the focus drive signal SFD.

In this way, the optical disc apparatus 10 feedback-controls (or focus-controls) the objective lens 18 so as to focus the servo light beam LS at the reflection surface 102 of the optical disc 100.

Additionally, the optical disc apparatus 10 tracking-controls the objective lens 18 by means of a so-called push-pull method.

The signal processing section 13 computationally determines a tracking error signal STE1 by means of formula (2) shown below, using the servo detection signal U1 (or the detection signals U1A through U1D).

$$STE1 = (U1A + U1B) - (U1C + U1D) \quad (2)$$

The tracking error signal STE1 represents the quantity of relative displacement of the focus FS of the servo light beam LS and the target track TG on the reflection surface 102 of the optical disc 100.

The drive control section 12 generates a tracking drive signal STD according to the tracking error signal STE1 and supplies it to the biaxial actuator 19. The biaxial actuator 19 drives the objective lens 18 in the tracking direction according to the tracking drive signal STD.

Thus, the optical disc apparatus 10 feedback-controls (or tracking-controls) the objective lens 18 so as to focus the servo light beam LS at the target track TG on the reflection surface 102 of the optical disc 100.

In this way, the servo optical system 30 of the optical pickup 17 irradiates the reflection surface 102 of the optical disc 100 with the servo light beam LS, receives the servo reflected light beam LSR that is produced as the servo light beam LS is reflected by the reflection surface 102 and generates a servo detection signal U1 according to the outcome of reception of the servo reflected light beam LSR. Additionally, the optical disc apparatus 10 controls the objective lens 18 for focus control and tracking shift control under the control of the signal processing section 13 and the drive control section 12 so as to focus the servo light beam LS to the target track TG on the reflection surface 102.

(1-3-2) Configuration of Information Optical System

The information optical system 50 irradiates the irradiation surface 100A of the optical disc 100 with a recording light beam LC to record information on the optical disc 100. Additionally, the information optical system 50 irradiates the irradiation surface 100A of the optical disc 100 with a reading light beam LD and detects a reading reflected light beam LDR returning from the optical disc 100, which is a part of the reading light beam LD, to reproduce information from the optical disc 100.

The laser diode 51 of the information optical system 50 is adapted to emit a linearly polarized blue laser beam with a wavelength of about 405 nm. In operation, the laser diode 51 emits a recording light beam LC that is divergent light under the control of the control section 11 (FIG. 3) and beam splitter 52 transmits part of the recording light beam LC so as to make it enter a polarization beam splitter 53 to record information on the optical disc 100.

The polarization beam splitter 53 is adapted to reflect or transmit the light beam at the reflection/transmission surface 53S thereof at a ratio that varies as a function of the direction of polarization of the light beam. For example, the reflection/transmission surface 53S may be adapted so as to transmit a P-polarized light beam but reflect an S-polarized light beam by about 90% and transmit the remain of about 10%.

In operation, the polarization beam splitter 53 reflects the recording light beam LC that is S-polarized light by about 90% at the reflection/transmission surface 53S so as to make it enter a mark layer selection lens 55 and transmits the remain of about 10% so as to make it strike a photodetector 54. The recording light beam LC that is made to strike the photodetector 54 will be referred to as monitoring recording light beam LCM hereinafter.

The photodetector 54 receives the monitoring recording light beam LCM and generates a detection signal SCM that corresponds to the quantity of light thereof, which the detection signal SCM is then supplied to the drive control section 12. As in the case of the servo light beam LS, the drive control section 12 feedback-controls the quantity of light of the recording light beam LC emitted from the laser diode 51 according to the detection signal SCM so as to maintain the quantity of light of the recording light beam LC to a desired level.

On the other hand, the mark layer selection lens 55 changes the angle of divergence of the recording light beam LC and makes it enter the dichroic prism 36.

The mark layer selection lens 55 is adapted to be driven to move in the direction of the optical axis of the recording light beam LC by means of an actuator (not shown). In operation, the mark layer selection lens 55 is driven to move under the control of the control section 11 (FIG. 3) so as to be able to change the state of convergence of the recording light beam LC it emits in any of various different ways.

The dichroic prism 36 reflects the recording light beam LC at the reflection/transmission surface 36S thereof as a function of the wavelength of the recording light beam LC and makes it enter the aberration correcting section 37. The aberration correcting section 37 corrects the aberration of the recording light beam LC and makes it strike the ¼ wave plate 38.

The ¼ wave plate 38 coverts the recording light beam LC that is S-polarized light into left circularly polarized light and makes it enter the objective lens 18. The objective lens 18 converges the recording light beam LC and makes it project the irradiation surface 100A of the optical disc 100.

In the optical pickup 17, the distance between the focus FC of the recording light beam LC and the focus FS of the servo light beam LS in the focusing direction is determined according to the angle of divergence of the recording light beam LC when it is emitted from the mark layer selection lens 55.

In operation, the position of the mark layer selection lens 55 is adjusted so as to make the distance between the focus FC and the focus FS in the focusing direction agree with the distance d (FIG. 1) between the reflection surface 102 and the mark layer Y that is the target (to be referred to as the target mark layer YG hereinafter).

The objective lens 18 is controlled for focus control so as to focus the servo light beam LS at the target track TG on the reflection surface 102. Thus, the objective lens 18 focuses the recording light beam LC at the target mark layer YG in the recording layer 101 as shown in FIG. 1.

As a result, a recording mark RM is formed at the target mark layer YG in the recording layer 101 of the optical disc 100.

On the other hand, the light emitting diode (LED) 61 of the information optical system 50 is adapted to emit a light beam with a wavelength of about 405 nm. In operation, the LED 61 emits a reading light beam LD that is divergent light with a predetermined quantity of light and makes it enter the lens 62 to reproduce information from the optical disc 100 under the control of the control section 11 (FIG. 3).

The lens 62 changes the angle of divergence of the reading light beam LD and makes it strike the beam splitter 52. The beam splitter 52 reflects only the S-polarized light component out of the reading light beam LD that includes various S-polarized light components and makes it strike the polarization beam splitter 53.

The polarization beam splitter 53 reflects the reading light beam LD that is now S-polarized light by about 90% and makes it enter the mark layer selection lens 55 but transmits the remain of about 10% and makes it strike the photodetector 54 at the reflection/transmission surface 53S thereof. In the following, the reading light beam LD that is made to strike the photodetector 54 will be referred to as a monitoring reading light beam LDM.

The photodetector 54 receives the monitoring reading light beam LDM and generates a detection signal SDM that corresponds to the quantity of light thereof, which the detection signal SDM is then supplied to the drive control section 12. As in the case of the recording light beam LC, the drive control section 12 feedback-controls the quantity of light of the reading light beam LD emitted from the LED 61 according to the detection signal SDM so as to maintain the quantity of light of the reading light beam LD to a desired level.

On the other hand, the mark layer selection lens 55 changes the angle of divergence of the reading light beam LD and makes it enter the dichroic prism 36.

The dichroic prism 36 reflects the reading light beam LD at the reflection/transmission surface 36S thereof and makes it enter the aberration correcting section 37 depending on the wavelength of the reading light beam LD. The aberration correcting section 37 corrects the aberration of the reading light beam LD and makes it strike the ¼ wave plate 38.

The ¼ wave plate 38 converts the reading light beam LD that is S-polarized light into left circularly polarized light and makes it enter the objective lens 18. The objective lens 18 converges the reading light beam LD and irradiates the irradiation surface 100A of the optical disc 100 with it.

At this time, the reading light beam LD is converged to a certain extent by the objective lens 18 but not to a single spot due to reasons including that the LED 61 is not a point source of light. In other words, the reading light beam LD proceeds in the recording layer 101 as "a blurred light beam" that is collimated light having a certain diameter and then is reflected by the reflection surface 102 of the optical disc 100.

In the following, the light beam reflected by the reflection surface 102 will be referred to as reading reflected light beam LDR. The reading reflected light beam LDR becomes right circularly polarized light as the sense of rotation of the circularly polarized light is inverted when it is reflected by the reflection surface 102 of the optical disc 100.

The reading reflected light beam LDR proceeds in the recording layer 101 in the direction opposite to the proceeding direction of the reading light beam LD, or from the side of the reflection surface 102 toward the side of the irradiation surface 100A.

At this time, the reading reflected light beam LDR spreads to a certain extent (e.g., to such an extent that it may include several to tens of several recording marks RM) including a position that corresponds to the target track TG of the reflection surface 102 in the target mark layer YG (to be referred to as target position PG hereinafter).

If a recording mark RM is formed on its light path, a part of the reading reflected light beam LDR is blocked by the recording mark RM and only the remaining part thereof keeps on proceeding. Additionally, the reading reflected light beam LDR becomes light that is scattered to a certain extent as shown in FIG. 2.

Thereafter, the reading reflected light beam LDR follows the light path of the reading light beam LD in the opposite direction so as to enter the dichroic prism 36 sequentially passing through the objective lens 18, the ¼ wave plate 38 and the aberration correcting section 37. The reading reflected light beam LDR is converted from right circularly polarized light into P-polarized light (or linearly polarized light) by the ¼ wave plate 38.

The dichroic prism 36 reflects the reading reflected light beam LDR and the layer selection lens 55 changes the angle of divergence of the reading reflected light beam LDR. Then, the reading reflected light beam LDR enters the polarization beam splitter 53. The polarization beam splitter 53 transmits the reading reflected light beam LDR that is P-polarized light and makes it strike a photodetector 66 by way of a slit 65.

Figure 6:
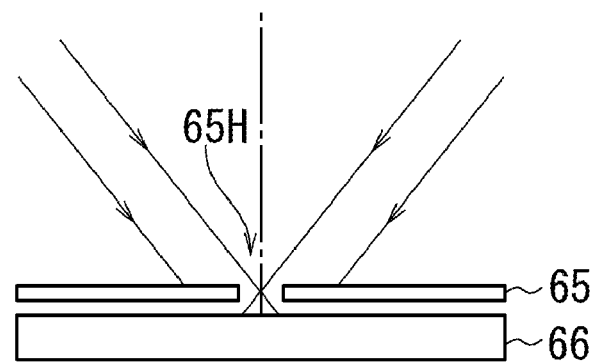
FIG. 6 is a schematic illustration of selection of a light beam by means of a pin hole.

As shown in FIG. 6, the slit 65 has a hole section 65H at a position that is optically conjugated with the target position PG in the reading layer 101 of the optical disc 100, or the confocal point with the target position PG. Note that the position of the mark layer selection lens 55 is so adjusted that the target mark layer YG is located at the confocal point of the hole section 65H under the control of the control section 11.

Thus, the slit 65 allows only the part of the reading reflected light beam LDR that passes the target position PG of the target mark layer YG to pass through it and irradiates the photodetector 66 with it. On the other hand, the slit 65 blocks almost all the part of the reading reflected light beam LDR that passes other than the target position PG.

Figure 5B:
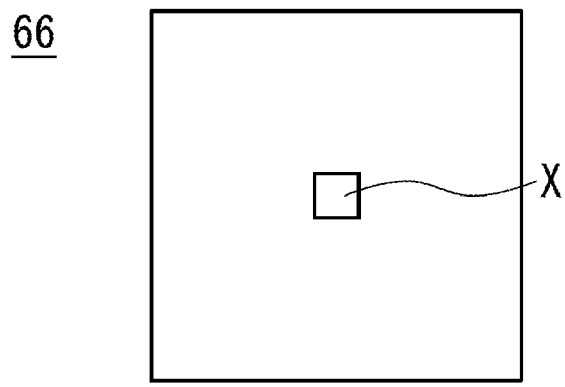

The photodetector 66 has a single detection region X as shown in FIG. 5B and generates a detection signal U2 that shows a signal level corresponding to the outcome of detection of the reading reflected light beam LDR. Note that the detection region X is substantially the confocal point with the target position PG just like the hole section 65H of the slit 65 because the photodetector 66 is arranged in the vicinity of the slit 65.

Therefore, on the basis of the same principle as a confocal microscope observes and object, the state of the reading reflected light beam LDR passes in the target position PG is reflected to the detection region X.

In operation, if a recording mark RM is formed at the target position PG of the optical disc 100, the reading reflected light beam LDR is blocked by the recording mark RM. Therefore, the reading reflected light beam LDR substantially does not get to the detection region X that is the confocal point with the target position PG. Then, the photodetector 66 generates a detection signal U2 of a relatively low level.

If, on the other hand, no recording mark RM is formed at the target position PG, the reading reflected light beam LDR is not blocked at the target position PG. Therefore, the reading reflected light beam LDR gets to the detection region X. Then, the photodetector 66 generates a detection signal U2 of a relatively high level.

The detection region X of the photodetector 66 generates a detection signal U2 representing the outcome of detection of the reading reflected light beam LDR and supplies it to the signal processing section 13.

The signal processing section 13 of the optical disc apparatus 10 executes a modulation process to make the code value equal to "0" when the signal level is low and make the code value equal to "1" when the signal level is high on the basis of the detection signal U2 and also executes a predetermined decoding process to reproduce the recorded information.

As described above, when reproducing information from the optical disc 100, the optical pickup 17 makes the reading reflected light beam LDR proceed from the reflection surface 102 of the optical disc 100 to the side of the objective lens 18 and detects the state of the reading reflected light beam LDR observed when the reading reflected light beam LDR passes the target position PG at the detection region X arranged at the confocal point thereof.

(1-4) Operation and Effect

With the above-described arrangement, when reproducing information from the optical disc 100, the optical disc apparatus 10 emits a reading light beam LD from the LED 61 and irradiates the optical disc 100 with it from the irradiation surface 100A thereof.

The reading light beam LD is converged by the objective lens 18 to a state of having a certain beam diameter and proceeds in the recording layer 101 of the optical disc 100 as substantially collimated light. Then, it is reflected by the reflection surface 102 to become a reading reflected light beam LDR. The reading reflected light beam LDR is converged by the objective lens 18 and the mark layer selection lens 55.

At this time, the optical disc apparatus 10 detects the reading reflected light beam LDR that passes the target position PG in the recording layer 101 by means of the detection region X located at the confocal point of the target position PG and generates detection signal U2.

Subsequently, the optical disc apparatus 10 recognizes the presence or absence of a recording mark RM at the target position PG by means of the signal processing section 13 on the basis of the detection signal U2 and reproduces information by way of a predetermined demodulation process and a predetermined decoding process.

Therefore, the optical disc apparatus 10 can detect the reading reflected light beam LDR depending on the state of the reading reflected light beam LDR observed when the reading reflected light beam LDR passes the target position PG at the detection region X arranged at the confocal point thereof and can recognize the presence or absence of a recording mark RM according to the outcome of detection.

At this time, it is sufficient for the optical disc apparatus 10 that the reading reflected light beam LDR having a certain beam diameter in the recording layer 101 of the optical disc 100 at least passes the target position PG.

Thus, if the reading light beam LD shows a relatively low positional accuracy of irradiation and hence is displaced to a certain extent, the optical disc apparatus 10 can correctly recognize the presence or absence of a recording mark RM so long as the reading reflected light beam LDR passes the target position PG.

In other words, the optical disc apparatus 10 is not required to raise the accuracy of convergence and the positional accuracy of irradiation of the reading light beam LD if compared with conventional optical disc apparatus that need to converge a light beam to a target position PG (or to a spot) when reproducing information. Therefore, the mechanism and the circuit for position control processes of the optical disc apparatus 10 can be simplified and downsized.

Additionally, the optical disc apparatus 10 can detect a recording mark RM so long as the reading reflected light beam LDR is blocked to a certain extent by the recording mark RM.

In other words, a recording mark RM in the optical disc 100 can show a low accuracy level of formation and may not be able to completely block the reading reflected light beam LDR. However, if such is the case, the optical disc apparatus 10 can highly probably obtain an outcome of reception of light that is different from a case where no recording mark RM is formed by means of the detection region X of the photodetector 66 so long as the reading reflected light beam LDR is scattered to a certain extent by the recording mark RM.

Therefore, if compared with the optical disc apparatus adapted to reproduce information on the basis of the light beam reflected by a recording mark RM, the recording mark RM of the optical disc 100 is not required to be formed highly accurately in order to show a high reflectance for the optical disc apparatus 10. In other words, the optical disc apparatus 10 can correctly reproduce information if the accuracy level of formation of a recording mark RM is relatively low.

Thus, with the above-described arrangement, when reproducing information from the optical disc 100, the optical disc apparatus 10 converges the reading light beam LD emitted from the LED 61 by means of the objective lens 18 to make it substantially collimated light and irradiates it to the optical disc 100 so as to make it reflected by the reflection surface 102 and become a reading reflected light beam LDR. Then, the optical disc apparatus 10 converges the reading reflected light beam LDR by means of the mark layer selection lens 55 and detects the reading reflected light beam LDR after passing the target position PG by means of the detection region X at the confocal point of the target position PG. Subsequently, the optical disc apparatus 10 generates a detection signal U2 and recognizes the presence or absence of a recording mark RM on the basis of the detection signal U2 to reproduce information. Thus, the optical disc apparatus 10 can detect the state of the reading reflected light beam LDR observed when the reading reflected light beam LDR passes the target position PG and can recognize the presence or absence of a recording mark RM on the basis of the outcome of detection.

(2) Second Embodiment (2-1) Configuration of Optical Disc Apparatus and that of Optical Disc When compared with the optical disc apparatus 10 of the first embodiment, the optical disc apparatus 110 (FIG. 3) of the second embodiment differs in terms of a control section 111, a drive control section 112, a signal processing section 113 and an optical pickup 117 thereof that correspond respectively to the control section 11, the drive control section 12, the signal processing section 13, and the optical pickup 17 of the first embodiment.

Like the control section 11, the control section 111 comprehensively controls the optical disc apparatus 110. The signal processing section 113 generates a focus error signal similar to its counterpart of the first embodiment but it generates a tracking error signal by means of a technique different from the first embodiment.

Like the drive control section 12, the drive control section 112 controls the objective lens 18 for focus control and tracking control according to the focus error signal and the tracking error signal.

However, the optical disc apparatus 110 has a configuration similar to that of the optical disc apparatus 10 of the first embodiment in terms of the other components and hence those components will not be described any further.

The optical disc 100 (FIG. 1) of the second embodiment has a configuration same as that of the first embodiment.

(2-2) Configuration of Optical Pickup

Figure 7:
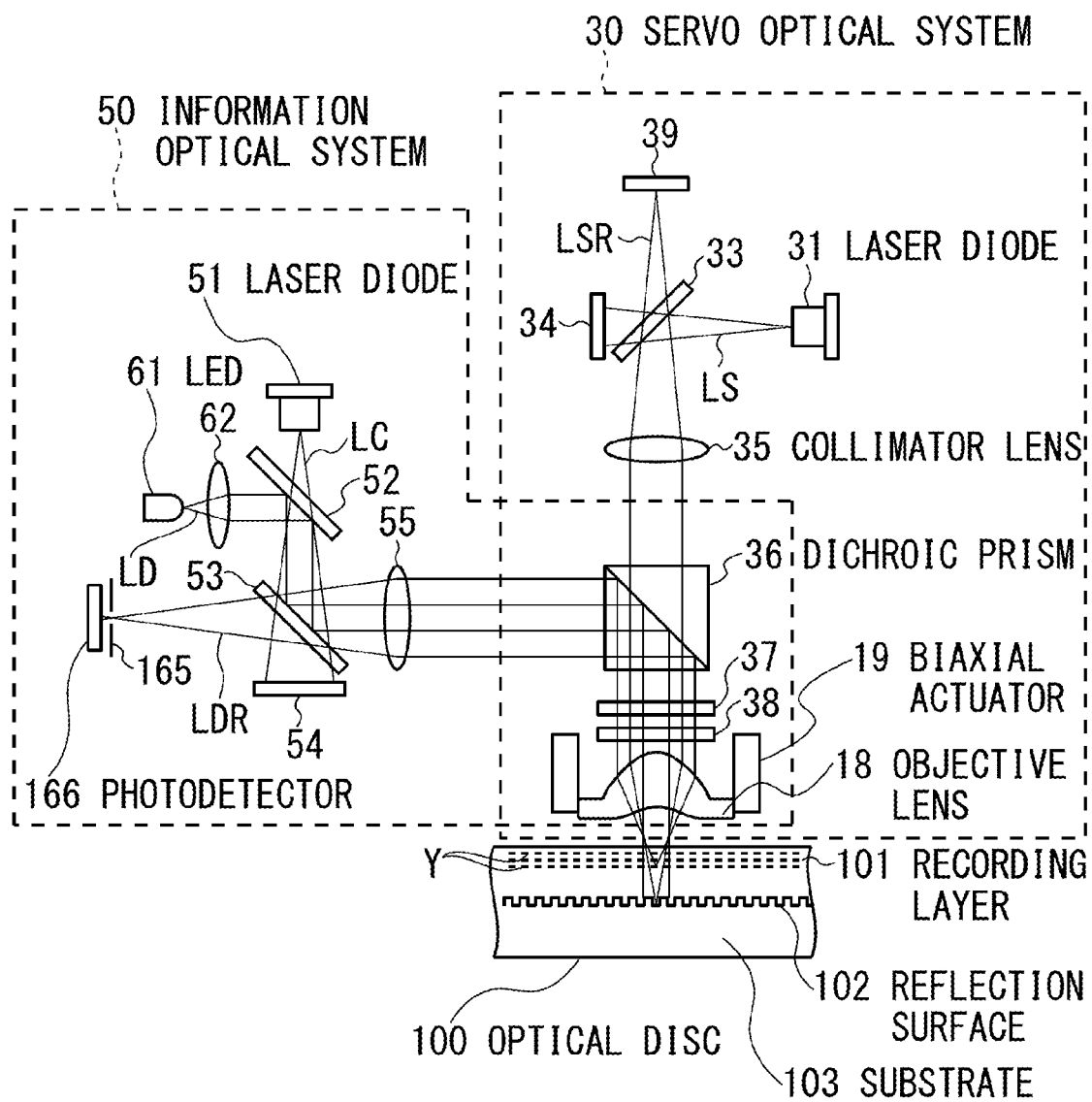
FIG. 7 is a schematic block diagram of optical pickup according to a second embodiment of the present invention.

The optical pickup 117 is the same as the optical pickup 17 (FIG. 4) of the first embodiment except that the slit 65 and the photodetector 66 of the first embodiment are replaced by a slit 165 and a photodetector 166 as shown in FIG. 7, where the components that correspond to those of FIG. 4 are denoted respectively by the same reflectance symbols.

Figure 8:
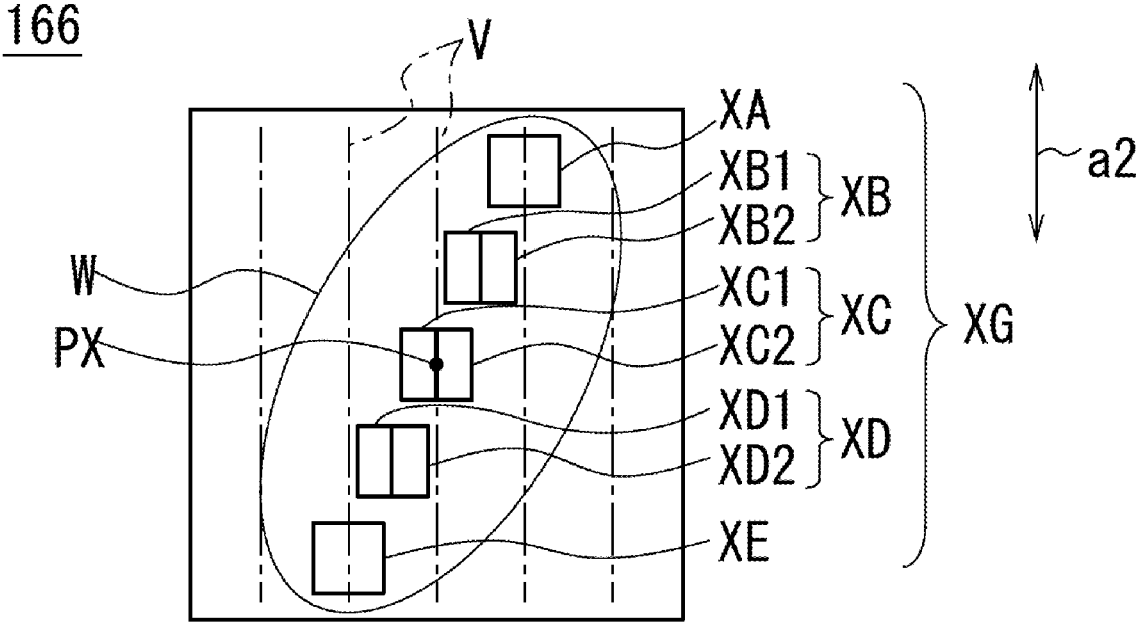
FIG. 8 is a schematic illustration of the photodetector of the second embodiment.

As shown in FIG. 8 that corresponds to FIG. 5B, the photodetector 166 has five detection regions XA, XB, XC, XD, and XE (to be referred to as detection region group XG hereinafter).

Each of the detection regions XB, XC, and XD is divided into two divided detection regions along the running direction of the tracks so as to produce divided detection regions XB1 and XB2, XC1 and XC2, and XD1 and XD2. In FIG. 8, double arrow a2 corresponds to the running direction of the tracks.

The detection regions XA, XC, and XE are arranged such that the gaps separating their respective virtual centers correspond to the gaps separating the centers of the recording marks RM in the optical disc 100 and hence each of them corresponds to the width of a track.

Note that, in FIG. 8, corresponding virtual track lines V on the photodetector 166 that correspond to mark tracks MT in the target mark layer YG are indicated by dotted chain lines.

The gaps separating the centers of the detection regions XB and XD from the center of the detection region XC correspond to a half of the gaps separating adjacent mark tracks MT of the optical disc 100, or ½ of the width of a mark track.

On the other hand, the slit 165 (FIG. 7) is provided with hole sections at positions corresponding respectively to the detection regions XA, XB, XC, XD, and XE.

Differently stated, the optical pickup 117 is designed so that a position separated from the target mark track MTG by a track at the outer peripheral side and a position separated from the target mark track MTG by a track at the inner peripheral side (to be referred to as sub target positions PGS hereinafter) operate as so many confocal points of the detection regions XA and XE respectively, the target mark track MTG corresponding to the target track TG of the reflection surface 102.

The optical pickup 117 is additionally designed so that position separated from the target position PG by ½ track at the outer peripheral side and a position separated from the target position PG by ½ track at the inner peripheral side (to be also referred to as sub target positions PGS hereinafter) operate as so many confocal points of the detection regions XB and XD respectively.

Furthermore, the irradiating position of the reading reflected light beam LDR of the optical pickup 117 is adjusted by means of the objective lens 18 and other related component so as to include the target position PG and all the sub target positions PGS. Thus, the region W of the photodetector 166 is irradiated with the reading reflected light beam LDR if the slit 165 is omitted.

As a result, the state of the reading reflected light beam LDR observed when the reading reflected light beam LDR passes each of the positions including the target position PG and the sub target positions PGS is reflected to the detection regions XA, XB, XC, XD, and XE (to be referred to as detection region group XG hereinafter).

At this time, the detection regions XA and XE detect the reading reflected light beam LDR and respectively generate detection signals U3A and U3E as outcome of the detection.

The divided detection regions XB1 and XB2, XC1 and XC2, and XD1 and XD2 detect the reading reflected light beam LDR and respectively generate detection signals U3B1 and U3B2, U3C1 and U3C2, and U3D1 and U3D2 as outcome of the detection.

Furthermore, the photodetector 166 supplies the detection signals U3A, U3E, U3B1 and U3B2, U3C1 and U3C2, and U3D1 and U3D2 (to be collectively referred to as a detection signal U3 hereinafter) to the signal processing section 113.

The signal processing section 113 computationally determines a tracking error signal STE3 by means of formula (3) shown below and a differential push pull (DPP) method, using detection signals U3B1 and U3B2, U3C1 and U3C2, and U3D1 and U3D2, and supplies it to the drive control section 112.

$$STE3=(U3C1-U3C2)-k((U3B1-U3B2)+(U3D1-U3D2)) \quad (3)$$

The tracking error signal STE3 represents the quantity of relative displacement between the confocal point in the recording layer 101 that corresponds to the central point PX of the detection region XC and the target position PG in the tracking direction. Note that the coefficient k is a coefficient for producing a matching signal level.

The drive control section 112 generates a tracking drive signal STD on the basis of the tracking error signal STE3 and supplies it to the biaxial actuator 19. The biaxial actuator 19 drives the objective lens 18 in the tracking direction according to the tracking drive signal STD.

Thus, the optical disc apparatus 110 feedback-controls (or tracking-controls) the objective lens 18 so as to make the target position PG located at the confocal point with the central point PX of the detection region XC.

As a result, the state of the reading reflected light beam LDR observed when the reading reflected light beam LDR passes the target position PG and the state of the reading reflected light beam LDR observed when the reading reflected light beam LDR passes each of the sub target positions PGS is reflected to the detection region XC and the detection regions XA and XE respectively.

Additionally, the signal processing section 113 executes a demodulation process and a decoding process on the sum of adding the detection signals U3C1 and U3C2 to reproduce the information recorded on the target mark track MTG like the signal processing section 13 of the first embodiment.

In parallel, the signal processing section 113 executes a demodulation process and a decoding process on each of the detection signals U3A and U3E to reproduce the information recorded on the corresponding one of the two neighboring tracks of the target track TG.

In this way, the optical disc apparatus 110 controls the objective lens 18 for tracking control by means of the detection signal U3 obtained on the basis of the reading reflected light beam LDR and can recognize the presence or absence of a recording mark RM at each of the three mark tracks including the target mark track MTG on the target mark layer YG and the two neighboring tracks and reproduce information from the three mark tracks in parallel.

(2-3) Operation and Effect

With the above-described arrangement, when reproducing information from the optical disc 100, the optical disc apparatus 110 of the second embodiment emits a reading light beam LD from the LED 61 and irradiates it to the optical disc 100 from the irradiation surface 100A thereof.

The reading light beam LD is converged by the objective lens 18 to a state of having a certain beam diameter and proceeds in the recording layer 101 of the optical disc 100 as substantially collimated light. Then, it is reflected by the reflection surface 102 to become a reading reflected light beam LDR. The reading reflected light beam LDR is converged by the objective lens 18 and the mark layer selection lens 55.

At this time, the optical disc apparatus 100 detects the reading reflected light beam LDR that passes the target position PG and each of the sub target positions PGS in the recording layer 101 by means of the detection regions XA, XB, XC, XD, and XE located respectively at the confocal points of those positions and generates detection signal U3 on the basis of the outcome of detection.

Subsequently, the signal processing section 113 recognizes the presence or absence of a recording mark RM at the target position PG and each of the sub target positions PGS on the basis of the detection signal U3 and reproduces information from the three mark tracks including the target mark track MTG and the two neighboring tracks in parallel by way of a predetermined demodulation process and a predetermined decoding process.

Therefore, the optical disc apparatus 110 can detect the reading reflected light beam LDR depending on the state of the reading reflected light beam LDR observed when the reading reflected light beam LDR passes the target position PG and each of the sub target positions PGS at the corresponding one of the detection regions XA, XC, and XE arranged at the confocal points thereof and can recognize the presence or absence of a recording mark RM according to the outcome of detection.

At this time, it is sufficient for the optical disc apparatus 110 that the reading reflected light beam LDR having a certain beam diameter in the recording layer 101 of the optical disc 100 at least passes the target position PG and the sub target positions PGS.

Thus, as in the case of the first embodiment, the optical disc apparatus 110 is not required to rigorously control the position of irradiation of the reading light beam LD if compared with optical disc apparatus required to make the focus of the reading light beam agree with the position of a recording mark RM.

Additionally, it is sufficient for the optical disc apparatus 110 that the reading reflected light beam LDR is proceeding from the side of the reflection surface 102 toward the side of the irradiation surface 100A as substantially collimated light at the target position PG and each of the sub target positions PGS and that a single reading light beam LD is emitted from a single light source.

Therefore, if compared with the optical disc apparatus that are required to make the focus of a light beam agree with the target position PG and each of the sub target positions PGR by means of a grating or the like, the optical disc apparatus 110 is not required to raise the accuracy of position control of a light beam and hence the configuration thereof can be remarkably simplified.

Additionally, the optical disc apparatus 110 operates for tracking control, using the tracking error signal STE3 obtained on the basis of the detection signal U3. Therefore, if compared with an arrangement for tracking control that utilizes the reflection surface 102 like the first embodiment, the optical disc apparatus 110 can highly accurately make the confocal point that corresponds to the central point PX of the detection region XC agree with the target position PG in the recording layer 101 of the optical disc 100.

Otherwise, the optical disc apparatus 110 provides advantages similar to those of the optical disc apparatus 10 of the first embodiment.

Thus, with the above-described arrangement, when reproducing information from the optical disc 100, the optical disc apparatus 110 converges the reading light beam LD emitted from the LED 61 by means of the objective lens 18 to make it substantially collimated light and irradiates the optical disc 100 with it so as to make it reflected by the reflection surface 102 and become a reading reflected light beam LDR. Then, the optical disc apparatus 110 converges the reading reflected light beam LDR by means of the objective lens 18 and the mark layer selection lens 55 and detects the reading reflected light beam LDR after passing the target position PG and each of the sub target positions PGS by means of the detection region group XG at the respective confocal points thereof. Subsequently, the optical disc apparatus 110 generates a detection signal U3. Thus, the optical disc apparatus 110 can detect the state of the reading reflected light beam LDR observed when the reading reflected light beam LDR passes the target position PG and each of the sub target positions PGS so that it can recognize the presence or absence of a recording mark RM at each of those positions on the basis of the outcome of detection to reproduce information in parallel.

(3) Third Embodiment (3-1) Configuration of Optical Disc Apparatus and that of Optical Disc When compared with the optical disc apparatus 10 of the first embodiment, the optical disc apparatus 210 (FIG. 3) of the third embodiment differs in terms of a control section 211, a drive control section 212, a signal processing section 213 and an optical pickup 217 thereof that correspond respectively to the control section 11, the drive control section 12, the signal processing section 13 and the optical pickup 17 of the first embodiment.

Like the control section 11, the control section 211 comprehensively controls the optical disc apparatus 210. The signal processing section 213 generates a focus error signal and a tracking error signal by means of a technique different from the first embodiment.

Like the drive control section 12, the drive control section 212 controls the objective lens 18 for focus control and tracking control according to the focus error signal and the tracking error signal.

However, the optical disc apparatus 210 has a configuration similar to that of the optical disc apparatus 10 of the first embodiment in terms of the other components and hence those components will not be described any further.

The optical disc 100 (FIG. 1) of the third embodiment has a configuration same as that of the first embodiment.

(3-2) Configuration of Optical Pickup

Figure 9:
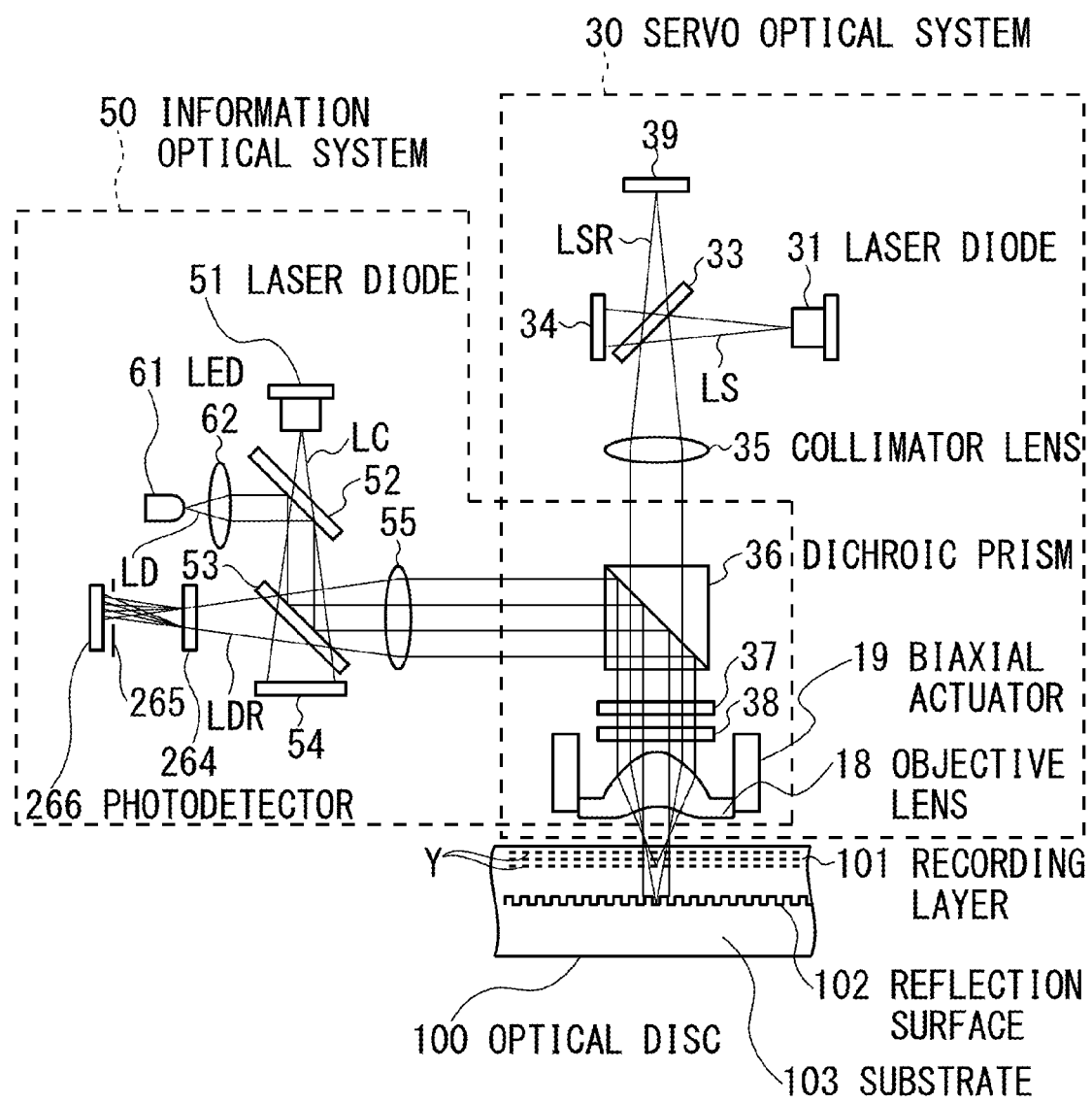
FIG. 9 is a schematic block diagram of optical pickup according to a third embodiment of the present invention.

The optical pickup 217 is the same as the optical pickup 17 (FIG. 4) of the first embodiment except that the slit 65 and the photodetector 66 of the first embodiment are replaced by a slit 265 and a photodetector 266 as shown in FIG. 9, where the components that correspond to those of FIG. 4 are denoted respectively by the same reflectance symbols.

The optical pickup 217 is provided on the light path of the reading reflected light beam LDR with a hologram element 264. Otherwise, the optical pickup 217 has the same configuration as the optical pickup 17.

Figure 10:
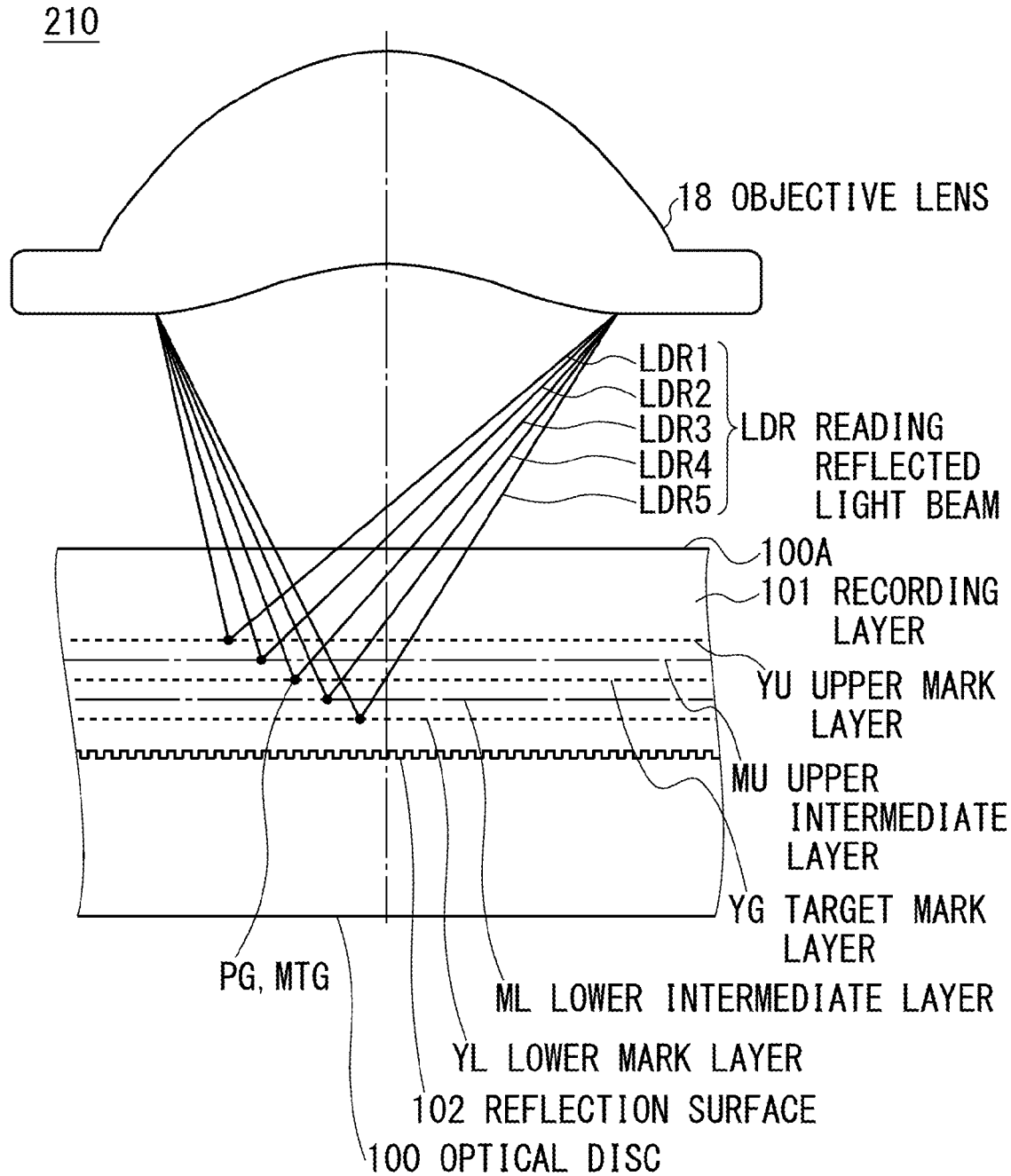
FIG. 10 is a schematic illustration of the light path of the reflected light beam that is read by the third embodiment.

The optical disc 100 is provided at the recording layer 101 thereof with a plurality of mark layers Y as pointed out above. As shown in FIG. 10, the mark layer Y located immediately above the target mark layer YG (and hence at the side of the irradiation surface 100A) is referred to as upper mark layer YU and the mark layer Y located immediately below the target mark layer YG (and hence at the side of the reflection surface 102) is referred to as lower mark layer YL.

Additionally, an upper intermediate layer MU and a lower intermediate layer ML are arranged as virtual layers respectively between the target mark layer YG and the upper mark layer YU and between the target mark layer YG and the lower mark layer YU.

Still additionally, of the reading reflected light beam LDR, the light beams that are focused respectively at the upper mark layer YU, the upper intermediate layer MU, the target mark layer YG, the lower intermediate layer ML, and the lower mark layer YL are referred to as reading reflected light beams LDR1, LDR2, LDR3, LDR4, and LDR5.

After following the same light path as the optical pickup 17 of the first embodiment, the reading reflected light beams LDR1, LDR2, LDR3, LDR4, and LDR5 are emitted from the polarization beam splitter 53 so as to enter the hologram element 264.

Figure 11:
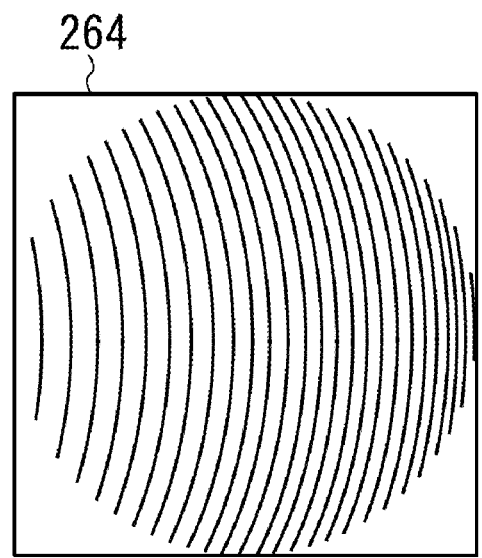
FIG. 11 is a schematic illustration of a hologram element, showing the configuration thereof.
Figure 12:
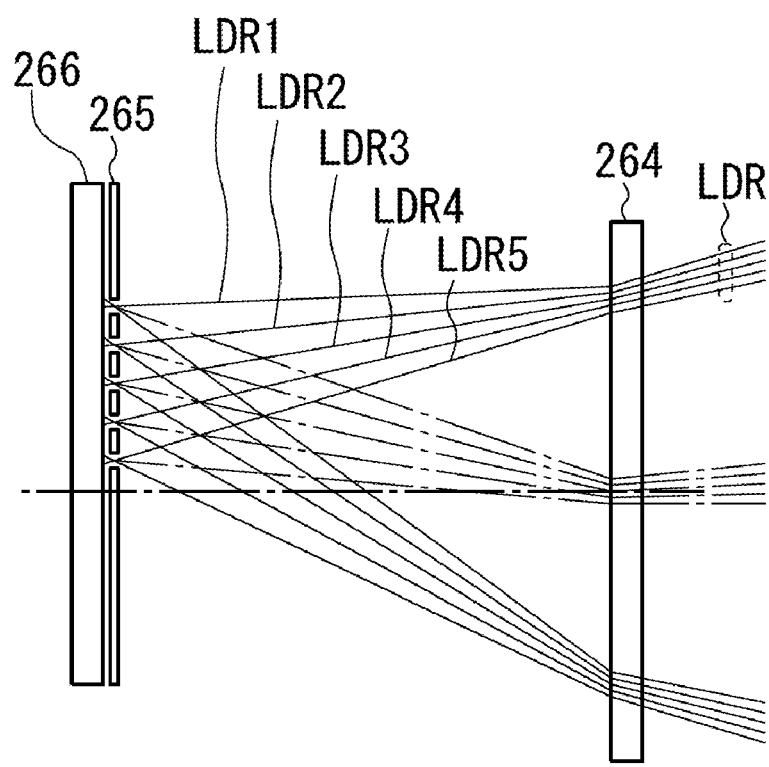
FIG. 12 is a schematic illustration of irradiation of a light beam onto a photodetector.

A hologram pattern as shown in FIG. 11 is formed at the hologram element 264. The hologram element 264 is adapted to diffract the reading reflected light beams LDR1, LDR2, LDR3, LDR4, and LDR5 and focus them on the slit 265 as shown in FIG. 12 due to its optical properties.

The amounting position and the mounting angle of the hologram element 264 are appropriately selected in the optical pickup 217. Additionally, the hologram pattern is appropriately formed at the hologram element 264. Thus, the hologram element 264 spectrally splits the reading reflected light beam LDR into the reading reflected light beams LDR1, LDR2, LDR3, LDR4, and LDR5 and irradiates them to the photodetector 266 by way of the slit 265.

If the slit 265 is omitted, the reading reflected light beams LDR1, LDR2, LDR3, LDR4, and LDR5 are irradiated to respective regions W1, W2, W3, W4, and W5.

Figure 13:
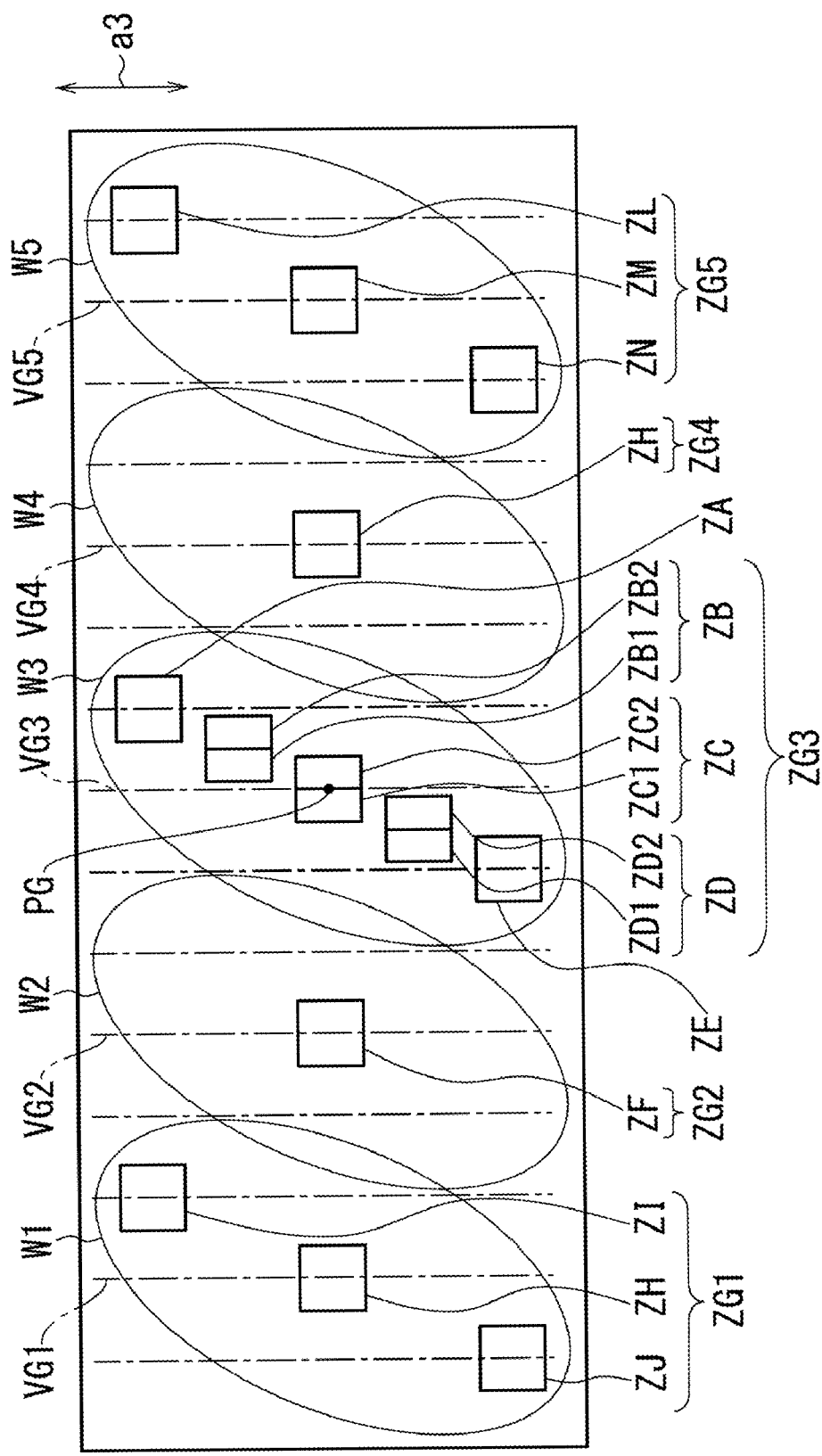
FIG. 13 is a schematic illustration of the photodetector of the third embodiment.

As shown in FIG. 13, which corresponds to FIG. 8, the photodetector 266 is provided with five detection region groups ZG1, ZG2, ZG3, ZG4, and ZG5 that correspond respectively to the regions W1, W2, W3, W4, and W5.

In FIG. 13, corresponding virtual track lines V on the photodetector 166 that correspond to tracks of the target mark layer YG are indicted by dotted chain lines. Particularly, the corresponding virtual track line VG3 corresponds to the target mark track MTG of the target mark layer YG and the point PZ corresponds to the target position PG.

Additionally, the corresponding virtual track lines VG1, VG2, VG4, and VG5 correspond to the respective tracks (or virtual tracks) located right above the target track TG (and hence at the side of the irradiation surface 100A) and/or right below the target track TG (and hence at the side of the reflection surface 102).

The detection region group ZG3 of this embodiment has a configuration similar to the detection region group XG of the second embodiment (FIG. 8) and includes five detection regions ZA, ZB, ZC, ZD, and ZE that correspond to the five detection regions XA, XB, XC, XD, and XE.

Like the detection regions XB, XC, and XD, each of the detection regions ZB, ZC, and ZD is divided into two divided detection regions so as to produce divided detection regions ZB1 and ZB2, ZC1 and ZC2, and ZD1 and ZD2.

In other words, the confocal points of the detection regions ZA through ZE of the optical pickup 217 are located on the target mark layer YG as in the case of the optical pickup 117 of the second embodiment.

On the other hand, single detection regions ZF and ZH are formed respectively in the detection region groups ZG2 and ZG4 at the positions corresponding to the position of the detection region ZC of the detection region groups ZG3.

Thus, with the optical pickup 217, the confocal point of the detection region ZF is located on the upper intermediate layer MU (FIG. 10) and the confocal point of the detection region ZH is located on the lower intermediate layer ML due to the interposition of the hologram element 264.

Additionally, detection regions ZI, ZJ, and ZK are formed in the detection region group ZG1 at respective positions that correspond to the positions of the detection regions ZA, ZC, and ZE of the detection region group ZG3.

Similarly, detection regions ZL, ZM, and ZN are formed in the detection region group ZG5 at respective positions that correspond to the positions of the detection regions ZA, ZC, and ZE of the detection region group ZG3.

Note that the detection regions ZJ and ZM are not divided and hence are single detection regions.

Thus, with the optical pickup 217, all the confocal points of the detection regions ZI through ZK are located on the upper mark layer YU (FIG. 10) and all the confocal points of the detection regions ZL through ZN are located on the lower mark layer YL.

Meanwhile, hole sections are arranged in the slit 265 (FIG. 12) at positions that respectively correspond to the positions of the detection regions ZA through ZN of the photodetector 266 as in the case of the slit 165 (FIG. 7).

As a result, with the optical pickup 217, the state of the reading reflected light beam LDZ that is observed when it passes the target position PG of the target mark layer YG and so on are reflected to the detection regions ZA, ZB, ZC, ZD, and ZE of the detection region group ZG3.

Each of the divided detection regions ZB1 and ZB2, ZC1 and ZC2, and ZD1 and ZD2 detects part of the reading reflected light beam LDR3. Then, then they generate respective detection signals U5B1 and U5B2, U5C1 and U5C2, and U5D1 and U5D2 as a result of detection and supply them to the signal processing section 213.

Each of the detection regions ZA and ZE detects part of the reading reflected light beam LDR3. Then, they generate respective detection signals U5A and U5E as a result of detection and supply them to the signal processing section 213.

At the same time, in the optical pickup 217, the states of the reading reflected light beam LDR observed when it passes the upper intermediate layer MU and the lower intermediate layer ML are reflected respectively to the detection region ZF of the detection region group ZG2 and the detection region ZH of the detection region group ZG4.

Each of the detection regions ZF and ZH detects part of the reading reflected light beam LDR2 and part of the reading reflected light beam LDR4. Then, they generate respective detection signals U5F and U5H as a result of detection and supply them to the signal processing section 213.

At the same time, in the optical pickup 217, the state of the reading reflected light beam LDR observed when it passes the upper mark layer YU and the lower mark layer YL are reflected to the detection regions ZI, ZJ, and ZK of the detection region group ZG1 and the detection regions ZL, ZM, and ZN of the detection region group ZG5.

Each of the detection regions ZI, ZJ, and ZK detects part of the reading reflected light beam LDR1. Then, they generate respective detection signals U5I, U5J, and U5K as a result of detection and supply them to the signal processing section 213.

Likewise, each of the detection regions ZL, ZM, and ZN detects part of the reading reflected light beam LDR5. Then, they generate respective detection signals U5L, U5M, and U5N as a result of detection and supply them to the signal processing section 213.

The optical disc apparatus 210 operates for focus control and tracking control, using the detection signals U5A through U5N (to be collectively referred to as detection signals U5 hereinafter) generated by the photodetector 266.

The signal processing section 213 firstly computationally determines the amplitude values RF5F and RF5H of the RF signal by executing a predetermined filtering process on the detection signals U5F and U5H. Subsequently, the signal processing section 213 computationally determines the difference of the amplitude values RF5F and RF5H by means of formula (4) shown below as a focus error signal SFE5 and supplies it to the drive control section 212.

$$SFE5 = RF5F - RF5H \quad (4)$$

The focus error signal SFE5 corresponds to the difference of intensity between the reading reflected light beam LDR2 from the upper intermediate layer MU and the reading reflected light beam LDR4 from the lower intermediate layer ML and hence represents the quantity of relative displacement of the confocal point of each of the detection regions ZA through ZE in the recording layer 101 and the target mark layer YG in the focusing direction.

The drive control section 212 generates a focus drive signal SFD on the basis of the focus error signal SFE5 and supplies it to the biaxial actuator 19. The biaxial actuator 19 drives the objective lens 18 in the focusing direction according to the focus drive signal SFD as in the case of the first embodiment.

Thus, the optical disc apparatus 210 feedback-controls (or focus-controls) the objective lens 18 so as to make the confocal points of each of the detection regions ZA through ZE in the recording layer 101 agree with the target mark layer YG Additionally, the signal processing section 213 computationally determines a tracking error signal STE5 by means of formula (5) shown below, which corresponds to the formula (3), using the detection signals U5B1 and U5B2, U5C1 and U5C2, and U5D1 and U5D2, and supplies it to the drive control section 212 as in the case of the signal processing section 113 of the second embodiment.

$$STE5 = (U5C1 - U5C2) - k((U5B1 - U5B2) + (U5D1 - U5D2)) \quad (5)$$

The drive control section 212 generates a tracking drive signal STD on the basis of the tracking error signal STE5 and supplies it to the biaxial actuator 19 to drive the objective lens 18 in the tracking direction.

As a result, the optical disc apparatus 210 can make the confocal point of the central point PZ of the detection region ZC agree with the target position PG in the recording layer 101.

At this time, the optical disc apparatus 210 can detect the reading reflected light beam LDR3 that passes the target mark layer YG at each of the detection regions ZA, ZC, and ZE that are conjugated with the target mark layer YG as in the case of the second embodiment.

This means that the optical disc apparatus 210 can recognize the presence or absence of a recording mark RM at each of the three mark tracks on the target mark layer YG and read information from the three mark tracks in parallel.

At the same time, the optical disc apparatus 210 can detect the reading reflected light beam LDR 1 that passes the upper mark layer YU at each of the detection regions ZI, ZJ, and ZK. Additionally, it can detect the reading reflected light beam LDR 5 that passes the lower mark layer YL at each of the detection regions ZL, ZM, and ZN.

This means that the optical disc apparatus 210 can read information from the three neighboring mark tracks on the upper mark layer YU and also from the three neighboring mark tracks on the lower mark layer YL simultaneously in addition to the three neighboring mark tracks on the target mark layer YG.

In this way, the optical disc apparatus 210 controls the obstacle for focus control and tracking control according to the detection signals U5 and can read information simultaneously from the three neighboring mark tracks of each of the target mark layer YG, the upper mark layer YU and the lower mark layer YL.

(3-3) Operation and Effect

With the above-described arrangement, when reproducing information from the optical disc 100, the optical disc apparatus 210 of the third embodiment emits a reading light beam LD from the LED 61 and irradiates the optical disc 100 with it from the irradiation surface 100A thereof.

The reading light beam LD is converged by the objective lens 18 to a state of having a certain beam diameter and proceeds in the recording layer 101 of the optical disc 100 as substantially collimated light. Then, it is reflected by the reflection surface 102 to become a reading reflected light beam LDR. The reading reflected light beam LDR is converged by the objective lens 18 and the mark layer selection lens 55.

Additionally, the reading reflected light beam LDR is spectrally split into reading reflected light beams LDR1 through LDR5 by the hologram element 264 and irradiated onto the respective regions W1 through W5 on the slit 265.

At this time, the optical disc apparatus 210 detects the reading reflected light beams LDR1 through LDR5 that pass the target position PG and other positions in the recording layer 101 by means of the detection regions ZA through ZN of the photodetector 266 located respectively at the confocal points of those positions and generates detection signals U5 on the basis of the outcome of detection.

Subsequently, the signal processing section 213 recognizes the presence or absence of a recording mark RM at each of the three neighboring tracks of each of the target mark layer YG, the upper mark layer YU and the lower mark layer YL and reproduces information from the three mark tracks of each of the mark layers Y in parallel by way of a predetermined demodulation process and a predetermined decoding process.

Therefore, the optical disc apparatus 210 can detect the reading reflected light beams LDR1, LDR3, and LDR5 depending on the states observed respectively at the confocal points of the detection regions ZA, ZC, ZE, ZI, ZJ, ZK, ZL, ZM, and ZN and can recognize the presence or absence of a recording mark RM at each of them according to the outcome of detection.

At this time, the optical disc apparatus 210 diffracts the reading reflected light beam LDR to produce the reading reflected light beams LDR1 through LDR5 by means of the hologram element 264 and hence it can make the confocal points of the five layers having different depths in the recording layer 101 agree with respective spots that are different from each other on the slit 265 that provides a single plane (FIGS. 10 and 12).

Therefore, as a result of arranging a plurality of detection region groups ZG1 through ZG5 on the uniform surface of the photodetector 266, the optical disc apparatus 210 can simultaneously detect the state observed when the reading reflected light beam LDR passes the three mark layers Y and the two intermediate layers M.

Additionally, it is sufficient for the optical disc apparatus 210 that the reading reflected light beams LDR1 through LDR5 having a certain beam diameter in the recording layer 101 of the optical disc 100 at least pass the respective confocal points that correspond to the detection regions ZA through ZN.

Thus, as in the case of the first embodiment, the optical disc apparatus 210 is not required to rigorously control the position of irradiation of the reading light beam LD if compared with the optical disc apparatus required to make the focus of the reading light beam agree with the position of a recording mark RM.

Additionally, it is sufficient for the optical disc apparatus 210 that the reading reflected light beam LDR is proceeding from the side of the reflection surface 102 toward the side of the irradiation surface 100A as substantially collimated light in all of the target mark layer YG, the upper mark layer YU and the lower mark layer YL.

In other words, the optical pickup 217 is simply required to emit a single reading light beam LD from the single light source of the LED 61 as in the case of the first and second embodiments.

Therefore, if compared with the optical disc apparatus that are required to make the focus of a light beam agree with each of the mark layers Y, the intermediate layers M and the photodetector 266 by means of a grating or the like, the optical disc apparatus 210 is not required to raise the accuracy of position control of a light beam and hence the configuration thereof can be remarkably simplified.

Additionally, the optical disc apparatus 210 controls the objective lens 18 for focus control and tracking control, using the focus error signal SFE5 and the tracking error signal STE5 obtained on the basis of the detection signal U5.

Therefore, if compared with an arrangement for focus control and tracking control that utilizes the reflection surface 102 like the first embodiment, the optical disc apparatus 210 can highly accurately make the confocal point that corresponds to the central point PZ of the detection region ZC agree with the target position PG in the recording layer 101 of the optical disc 100.

Otherwise, the optical disc apparatus 210 provides advantages similar to those of the optical disc apparatus 10 of the first embodiment and those of the optical disc apparatus 110 of the second embodiment.

Thus, with the above-described arrangement, when reproducing information from the optical disc 100, the optical disc apparatus 210 converges the reading light beam LD emitted from the LED 61 by means of the objective lens 18 to make it substantially collimated light and irradiates the optical disc 100 with it so as to make it reflected by the reflection surface 102 and become a reading reflected light beam LDR. Then, the optical disc apparatus 210 converges the reading reflected light beam LDR by means of the objective lens 18 the mark layer selection lens 55 and spectrally splits the reading reflected light beam LDR into reading reflected light beams LDR1 through LDR5 by the hologram element before irradiating the photodetector 266 with it. At this time, the optical disc apparatus 210 generates detection signals U5 according to the respective quantities of light at the detection regions ZA through ZN of the photodetector 266 that are confocal points of the upper mark layer YU, the upper intermediate layer MU, the target mark layer YG, the lower intermediate layer ML, and the lower mark layer YL. Thus, the optical disc apparatus 210 can detect the state of the reading reflected light beam LDR observed when the reading reflected light beam LDR passes the three neighboring tracks of each of the three mark layers Y including the target mark layer YG and the neighboring mark layers so that it can recognize the presence or absence of a recording mark RM at each of those positions on the basis of the outcome of detection to reproduce information in parallel.

(4) Other Embodiments

While a reading light beam LD is emitted from an LED 61 in each of the above-described embodiments, the present invention is by no means limited thereto and it may alternatively be so arranged that a reading light beam LD is emitted from some other light source. If such is the case, it is not necessary that the reading light beam LD is converged to a single point by the mark layer selection lens 55 and the objective lens 18 and hence it is sufficient that the reading light beam LD at least proceeds in the recording layer 101 of the optical disc 100 as substantially collimated light.

While the objective lens 18 is controlled for focus control by utilizing the reflection surface 102 in each of the first and second embodiments and the objective lens 18 is controlled for focus control by utilizing virtual upper intermediate layer MU and virtual lower intermediate layer ML in the third embodiment, the present invention is by no means limited thereto.

While one of the tracks formed on the reflection surface 102 is utilized for tracking control in the first embodiment and the target track TG on the target mark layer YG is utilized for tracking control in the first and third embodiments, the present invention is by no means limited thereto.

In other words, an optical disc apparatus according to the first embodiment of the present invention may be adapted so as to utilize any appropriate surface or layer of the optical disc 100 such as the reflection surface 102, the target mark layer YG or the virtual upper intermediate layer MU and the lower intermediate layer ML for focus control and tracking control. If such is the case, any known method that is being employed in known optical disc apparatus such as an astigmatism method or a three spots method may be used for generating a focus error signal and a tracking error signal. Additionally, an optical disc apparatus according to the first embodiment of the present invention may be adapted so as to be controlled for tilt control of controlling the angle of inclination of the objective lens relative to the optical disc 100.

The optical disc apparatus 10 of the above-described first embodiment is adapted so as to be able to not only reproduce information from the optical disc 100 but also record information on the optical disc 100, the present invention is by no means limited thereto. For example, the optical disc apparatus 10 may alternatively be adapted so as to be able to reproduce information from the optical disc 100 but unable to record information on the optical disc 100. This statement also applies to the second and third embodiments.

While the same wavelength of about 405 nm is employed for both the recording light beam LC and the reproducing light beam LD in each of the above-described embodiments, the present invention is by no means limited thereto and different wavelengths may alternatively be employed for the two light beams. If such is the case, it is sufficient for the recording light beam LC to form a recording mark RM in the recording layer 101 and for the reading light beam LD to be transmitted in the recording layer 101 and not to pass through the recording mark RM.

While the target position PG and the sub target positions PGS are arranged on the three tracks including the target track TG and the two neighboring tracks in the above-described second embodiment, the present invention is by no means limited thereto and a target position PG and sub target positions PGS may alternatively be arranged on an arbitrarily selected number of tracks such as five neighboring tracks or three tracks obtained by selecting every other track.

If such is the case, it is sufficient for the reading reflected light beam LDR to pass through the target position PG and each of the sub target positions PGS in the recording layer 101 and the photodetector 166 and the slit 165 are provided respectively with detection regions and hole sections that correspond to the target position PG and the sub target positions PGS.

While information is reproduced in parallel from the three layers including the target mark layer YG, the upper mark layer YU and the lower mark layer YL in the above-described third embodiment, the present invention is by no means limited thereto. For example, it may alternatively be arranged so that information is reproduced in parallel from an arbitrarily selected number of layers such as five layers including the target mark layer YG and the two upper layers and the two lower layers.

If such is the case, it is sufficient that the hologram pattern formed on the hologram element 264 can diffract the light beam so as to correspond to the number of layers and the photodetector 266 and the slit 265 are provided respectively with detection regions and hole sections that correspond to the mark layers Y.

While the mark layer selection lens 55 is formed by a single lens in each of the above-described embodiments, the present invention is by no means limited thereto and the mark layer selection lens may be formed by combining a plurality of lenses. If such is the case, it is sufficient that the depth of the focus FC of the recording light beam LC converged by the objective lens 18 can be changed by changing the angle of divergence of the light beam emitted from the mark layer selection lens.

While spiral tracks are formed on the reflection surface 102 in each of the above-described embodiments, the present invention is by no means limited thereto. For example, pits or a combination of guide grooves and pits may be formed on the reflection surface 102. The tracks on the reflection surface 102 may be not spiral but concentric. In any case, it is sufficient for the optical disc apparatus 10, 110, and 210 to be able to identify any specific position on the surface of the optical disc 100 by means of a servo reflected light beam LSR.

While tracks are formed on the reflection surface 102 of the optical disc 100 and the optical disc apparatus operates for focus control and tracking control by causing a servo light beam LS to be reflected by the reflection surface 102 in each of the above-described embodiments, the present invention is by no means limited thereto.

For example, a servo surface may be independently formed between the reflection surface 102 and the irradiation surface 100A of the optical disc 100 and tracks may be formed on the servo surface without forming tracks on the reflection surface 102 of the optical disc 100. Then, it is sufficient for the servo surface to have a dichroic property of reflecting the servo light beam LS and transmitting the reading light beam LD.

While the optical disc apparatus 10, 110, or 210 is formed by an LED 61 that operates as reproducing light source, an objective lens 18, a photodetector 66, 166, or 266, which ever appropriate, that operates as reproducing light detecting section and a signal processing section 13, 113, or 213, whichever appropriate, that operates as reproduction processing section in each of the above-described embodiment, the present invention is by no means limited thereto. An optical disc apparatus of the present embodiment may alternatively be formed by a reproducing light source, an objective lens, a reproducing light detecting section, and a reproduction processing section having configurations different from those described above.

The present invention can find applications in optical disc apparatus for reproducing information as images, sounds or computer data from an optical disc.

It should be understood by those skilled in the art that various modifications, combinations, sub-combinations and alterations may occur depending on design requirements and other factors insofar as they are within the scope of the appended claims or the equivalents thereof.

What is claimed is:

1. An optical disc apparatus comprising:
    a reproducing light source that emits a reproducing light beam not to be converged to a single spot at a time of convergence onto an optical disc having a recording layer including one or more mark layers where a plurality of recording marks representing respective pieces of information are arranged on a virtual plane and a reflection surface for reflecting the reproducing light beam to be used for reproducing the pieces of information;
    an objective lens that changes an angle of divergence of the reproducing light beam into substantially collimated light from an irradiation surface side opposite to the reflection surface with the recording layer interposed between them in the optical disc and projects collimated light so as to include a target position in a target mark layer;
    a reproducing light detecting section that has a detection region at a confocal point with the target position of the reproducing light beam passing through the recording layer, reflected by the reflection surface and passing through the recording layer and the objective lens once again to detect a quantity of light in the detection region; and
    a reproduction processing section that recognizes the presence or absence of a recording mark at the target position according to an outcome of detection in the detection region in order to reproduce a corresponding piece of information.

2. The optical disc apparatus according to claim 1, further comprising:
    a servo light source that emits a servo light beam different from the reproducing light beam;
    a servo light detecting section that detects a servo reflected light beam produced as the servo light beam is converged by the objective lens and reflected by the reflection surface; and
    a lens drive control section that controls a position of the objective lens according to an outcome of detection of the servo reflected light.

3. The optical disc apparatus according to claim 2, wherein:
    the reflection surface bears positional information recorded thereon to indicate positions on the reflection surface of the optical disc; and
    the lens drive control section acquires the positional information of the reflection surface based on the outcome of detection by the servo light detecting section and operates for tracking control of moving in a radial direction of the optical disc according to the positional information.

4. The optical disc apparatus according to claim 2, wherein the lens drive control section operates for focus control of driving the objective lens to move toward or away from the optical disc based on the outcome of detection by the servo light detecting section.

5. The optical disc apparatus according to claim 1, wherein:
a plurality of tracks are formed by spirally or concentrically arranging the plurality of recording marks on each of the one or more mark layers; and
the reproducing light detecting section has a plurality of detection regions so as to include confocal points with the plurality of recording marks on the plurality of tracks on the target mark layer; and
the reproduction processing section recognizes the presence or absence of each of the plurality of recording marks on the plurality of tracks and reproduces the respective pieces of information in parallel based on an outcome of detection by the plurality of detection regions of the reproducing light detecting section.

6. The optical disc apparatus according to claim 1, wherein:
the apparatus further includes a lens drive control section that controls a position of the objective lens;
the plurality of recording marks form a plurality of tracks as they are arranged spirally or concentrically on the one or more mark layers;
the reproducing light detecting section has another detection region having the target mark layer as confocal point in addition to the detection region including the confocal point with the target position; and
the lens drive control section operates for tracking control of moving the objective lens in a radial direction of the optical disc based on the outcome of detection in the detection region and/or the other detection region.

7. The optical disc apparatus according to claim 1, wherein:
the apparatus further includes a diffraction element that diffracts the reproducing light beam passed through the objective lens and spectrally splits the reproducing light beam into a plurality of reproducing light beams so as to have the one or more mark layers in the recording layer of the optical disc simultaneously as confocal points of the reproducing light detection section;
the reproduction light detecting section is provided with a plurality of detection regions so as to respectively include confocal points with the plurality of recording marks of the one or more mark layers;
the reproduction processing section recognizes the presence or absence of a recording mark at each of the one or more mark layers based on the outcome of detection by the plurality of detection regions of the reproducing light detecting section and reproduces the respective pieces of information in parallel.

8. The optical disc apparatus according to claim 7, wherein:
the apparatus further includes a lens drive control section that controls a position of the objective lens;
the diffraction element has each of intermediate layers as confocal points of the reproducing light detecting section, assuming that virtual intermediate layers being arranged respectively between the target mark layer and a neighboring mark layer at the side of the reflection surface and between the mark layer and the neighboring layer at the opposite side;
the reproducing light detecting section being provided with a plurality of detection regions for the intermediate layers so as to include the confocal points of positions corresponding to the target position in the intermediate layers; and
the lens drive control section operates for focus control of driving the objective lens to move toward or away from the optical disc based on the outcome of detection in the detection regions for the intermediate layers.

9. The optical disc apparatus according to claim 1, further comprising:
a layer selection lens that changes the angle of divergence of the reproducing light beam reflected by the reflection surface and passed through the objective lens depending on the target mark layer.

10. The optical disc apparatus according to claim 1, wherein
the reproducing light source emits the reproducing light beam having a different wavelength from a recording light beam emitted on the recording layer to form the recording mark.

11. An optical disc reproducing method comprising:
an emission step of emitting a reproducing light beam not to be converged to a single spot at a time of convergence onto an optical disc having a recording layer including one or more mark layers bearing a plurality of recording marks representing respective pieces of information arranged on a virtual plane and a reflection surface for reflecting the light beam to be used for reproducing the pieces of information;
an irradiation step of changing an angle of divergence of the reproducing light beam into substantially collimated light from an irradiation surface side opposite to the reflection surface with the recording layer interposed between them in the optical disc by a predetermined objective lens and irradiating with the collimated light so as to include a target position in a target mark layer;
a reproducing light detection step of detecting a quantity of light of the reproducing light beam passed through the recording layer, reflected by the reflection surface and passed the recording layer again and the objective lens by means of a detection region arranged at a confocal point with the target position; and
a reproduction processing step of recognizing the presence or absence of the recording mark at the target position based on an outcome of detection in the detection region in order to reproduce the information.

* * * * *